US 8,228,511 B2

(12) United States Patent
Takuwa

(10) Patent No.: US 8,228,511 B2
(45) Date of Patent: Jul. 24, 2012

(54) IMAGE FORMING APPARATUS

(75) Inventor: Noriyuki Takuwa, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 691 days.

(21) Appl. No.: 12/200,544

(22) Filed: Aug. 28, 2008

(65) Prior Publication Data

US 2009/0059262 A1 Mar. 5, 2009

Related U.S. Application Data

(60) Provisional application No. 60/969,592, filed on Aug. 31, 2007, provisional application No. 60/971,244, filed on Sep. 10, 2007.

(30) Foreign Application Priority Data

Jul. 31, 2008 (JP) ................. 2008-198854

(51) Int. Cl.
- *G03G 15/00* (2006.01)
- *G03G 21/20* (2006.01)
- *G03G 21/16* (2006.01)
- *G03G 15/20* (2006.01)
- *G06K 15/00* (2006.01)

(52) U.S. Cl. ........... 358/1.12; 399/91; 399/92; 399/111; 399/320; 399/407; 399/408; 399/82

(58) Field of Classification Search .............. 399/82, 399/92, 91, 111, 320, 407, 408; 358/1.12

See application file for complete search history.

(56) References Cited

U.S. PATENT DOCUMENTS

| 5,887,226 A | * | 3/1999 | Taki .............................. 399/92 |
| 6,430,382 B1 | * | 8/2002 | Okamoto et al. ............... 399/82 |
| 7,218,889 B2 | | 5/2007 | Yamada et al. |

FOREIGN PATENT DOCUMENTS

| JP | 11-220559 A | 8/1999 |
| JP | 2002-123138 A | 4/2002 |
| JP | 2003-76248 | 3/2003 |
| JP | 2004-109646 | 4/2004 |
| JP | 2004-334040 | 11/2004 |

OTHER PUBLICATIONS

Chinese Application No. 200810146759.5 Official Action (Apr. 20, 2011).
Japanese Application No. 2008-198854 Office Action (Jan. 10, 2012) (English translation attached).

* cited by examiner

*Primary Examiner* — Charlotte M Baker
*Assistant Examiner* — Justin Katzwhite
(74) *Attorney, Agent, or Firm* — Patterson & Sheridan, LLP

(57) ABSTRACT

The one embodiment of present invention provides an image forming apparatus including a memory unit that stores image data, a main control block that causes an image forming section to output an output image onto an output medium on the basis of the image data generated by an image reading section and stored in the memory unit, case members that houses any one of the memory unit and the main control block or both, respectively, and a cooling mechanism that is located in a predetermined position of the case members and guides an air flow that has passes through one case member to the other case member.

17 Claims, 18 Drawing Sheets

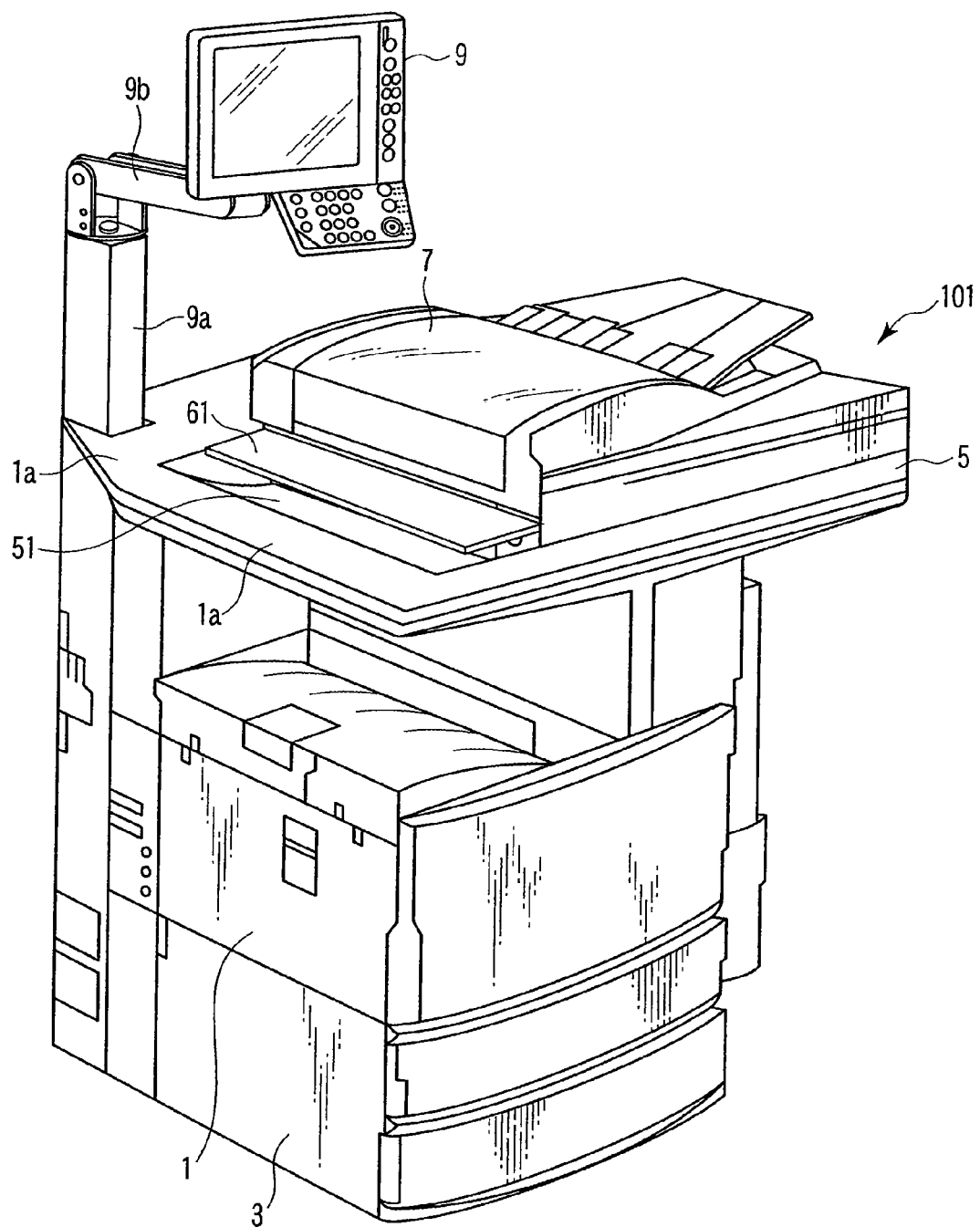
F I G. 8

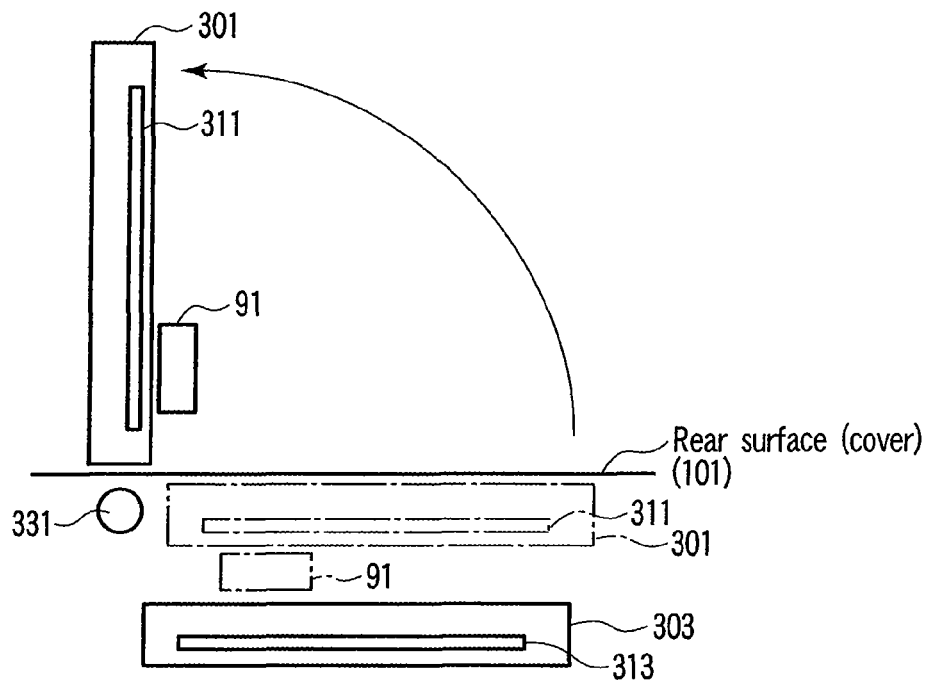
F I G. 15A
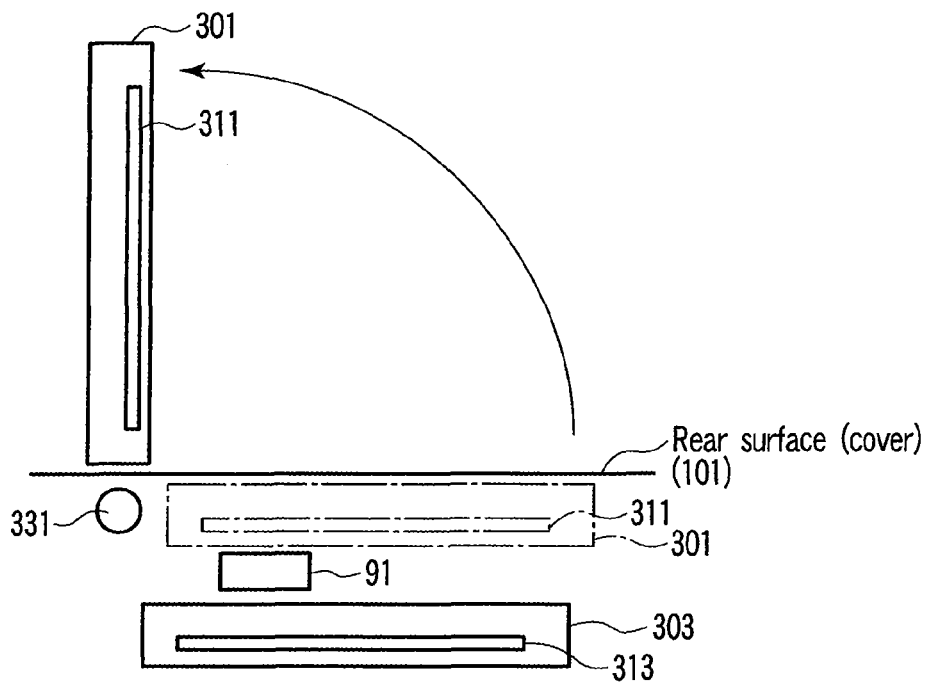
F I G. 15B

IMAGE FORMING APPARATUS

CROSS-REFERENCE TO RELATED APPLICATION

This application is based upon and claims the benefit of U.S. Provisional Applications No. 60/969,592, filed Aug. 31, 2007; and No. 60/971,244, filed Sep. 10, 2007, the entire contents of each of which are incorporated herein reference.

This application is also based upon and claims the benefit of priority from Japanese Patent application No. 2008-198854, filed on Jul. 31, 2008, the entire contents of which are incorporated herein reference.

TECHNICAL FIELD

The present invention relates to an image forming apparatus that can obtain a copy image and a printout of an object.

BACKGROUND

As an image forming apparatus in which general plain paper produced by applying no special processing to a sheet material can be used, image forming apparatuses employing various systems such as an electro-photographic system, an ink-jet system, and a thermal transfer system have already been widely spread. Nowadays, the image forming apparatus is called a multi-functional peripheral (MFP) because of functions thereof.

Many functions are added to the MFP according to requests of users. For example, there are known an MFP in which a stapler that can staple plural printouts with staples is integrally provided and an MFP to which a post-processing apparatus that can hold a large number of copies (a predetermined number is treated as one unit of copy) of printouts for each copy is connectable. In order to reduce a space for setting the MFP, a position where copy outputs and printouts are discharged is often set below an original scanning device and above an image forming section. Moreover, the MFP can be used in an integrated printer in a closed local area network (LAN) or can be used for output of data received by the MFP functioning as a facsimile (FAX). A function of a printer server may be given to the MFP.

Nowadays, in general, a mass storage device, for example, a hard disk drive (HDD) device is incorporated in the MFP in order to store a large amount of data (in the applications described above).

When a paper exit (discharge) tray is arranged on a lower surface of a scanning unit, since a user cannot see paper, the user cannot check presence or absence of the paper unless the user stoops down. The user cannot take out the paper either unless the user stoops down.

Since copy outputs and printouts are discharged to the lower surface of the scanning unit, heat tends to fill the unit, the discharged paper curls, or pieces of the discharged paper stick to one another. In some case, both the curl of the paper and the sticking of the paper occur.

When the paper exit tray is arranged on a side of a main body of the MFP, since paper is exited to the side of the main body, the user cannot take out the paper unless the user turns around.

As the main body is larger, it is more difficult to take out the paper. A larger setting area of the main body is required because of the paper discharge tray. When an option such as a finisher is attached, the paper discharge tray is not provided on the main body side.

For example, JP-A-2004-109646 proposes a finisher device including a main discharge tray and a sub-discharge tray. However, an example that two or more trays are arranged on the MFP is not disclosed.

Since both the sub-discharge tray and the main discharge tray are located on the side of an image forming apparatus main body shown in the above document, the user working near the image forming apparatus and a sheet medium processing apparatus is required to move in order to carry back (take out) a sheet (the user working near the image forming apparatus is required to take a forced posture in order to take out a sheet in that place).

On the other hand, since the HDD is mounted, on condition that a power SW (a main switch) that interrupts energization (supply of electric power) to the MFP main body in terms of hardware is not used except in an emergency, OFF control through an operation panel and a sub-power SW are also used to turn off a power supply (energization) after a system (an operation system) finishes operation.

The HDD has a large heating value and, moreover, the functions of the MFP itself are diversified. Therefore, heat generation from a control unit (a control block and a circuit board) is too large to be compared with those of printers and small copying machines in the past.

SUMMARY

According to the present invention, there is provided an image forming apparatus comprising: an image reading section configured to create image data; an image forming section configured to output an image corresponding to the image data onto an output medium; and a medium holding section configured to hold the output medium onto which the image is outputted by the image forming section and guided a same direction output from the image forming section and to be provided on a side of the image reading section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 8 is a schematic diagram showing a still another example of an image forming apparatus according to embodiment explained with reference to FIGS. 1 and 2;

FIGS. 15A and 15B are schematic diagrams each showing a relationship of a position of a fan that cools shield case members positioned between at a rear surface of the image forming apparatus and at least one of the shield case members;

DETAILED DESCRIPTION

Exemplary embodiments of the present invention will be hereinafter explained in detail with reference to the accompanying drawings.

Figure 1:
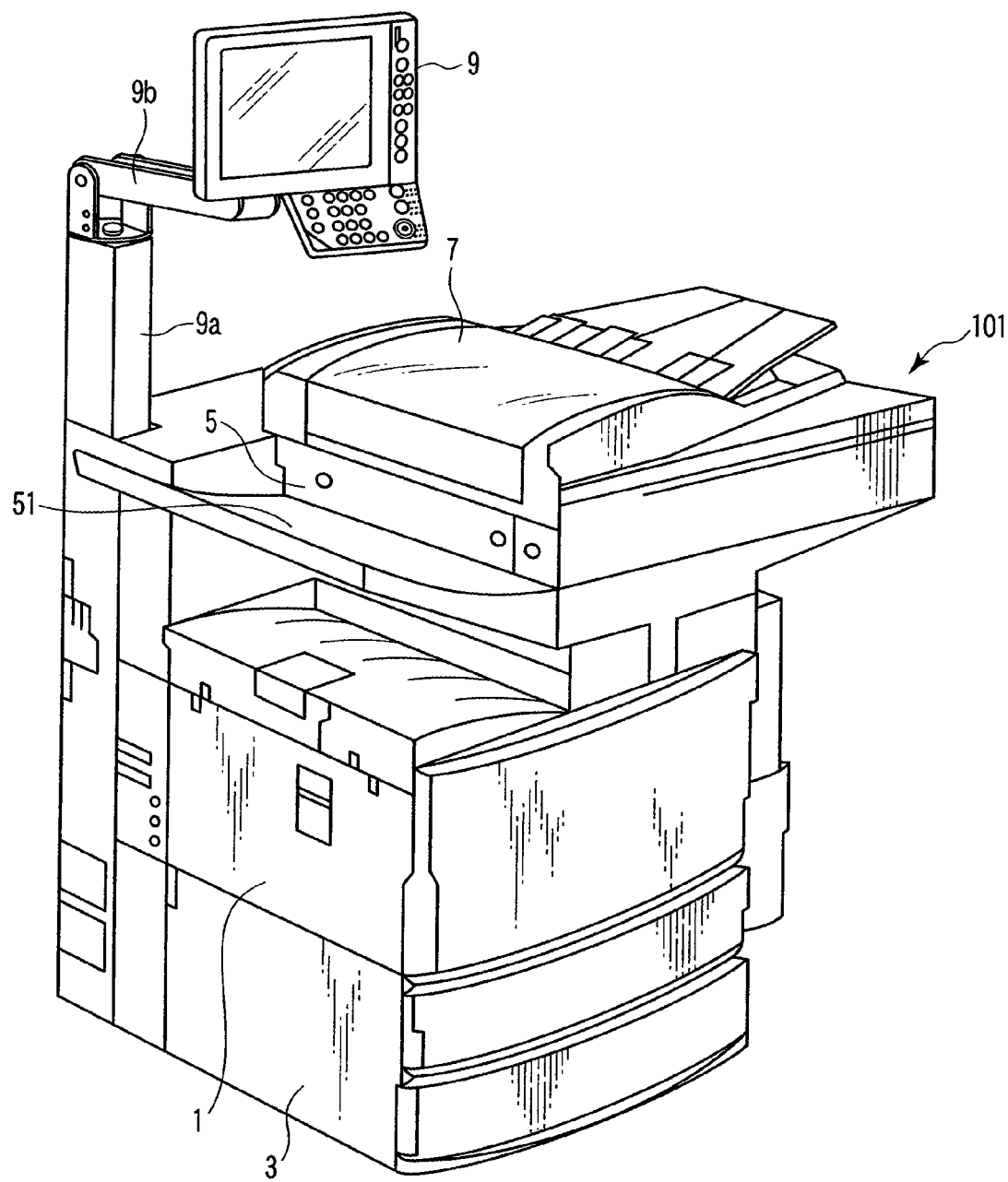
FIG. 1 is a schematic diagram showing an example of an image forming apparatus (MFP) according to an embodiment of the present invention.

FIG. 1 shows a main part of an image forming apparatus to which the present invention is applicable.

An image forming apparatus 101 shown in FIG. 1 has an image forming section main body 1 which outputs image information to creates an output image called, for example, a hard copy or a printout, a sheet feeding section 3 that can feed a sheet (an output medium) of an arbitrary size used for the image output to the image forming section main body 1, and an image reading section 5 that captures, as image data, image information subjected to image formation in the image forming section main body 1 from an object that holds the image information (hereinafter referred to as original).

In the image reading section 5, an automatic document feeder (ADF) 7 is integrally provided. When an original is like a sheet, after formation of an image output or capturing (hereinafter referred to as reading) of image information is finished, the ADF 7 discharges the original, for which the reading is finished, from a reading position to a discharge position and guides the next original to the reading position. It goes without saying that, although not shown in the figure, a general original cover (an original press) may be used instead of the ADF 7. A CCD sensor of the image reading section 5 is provided independently from an original table, in an arbitrary position in a conveying path through which an original is conveyed with the ADF 7. This makes it possible to read image information of the original being conveyed as image data without placing the original on the original table.

An instruction inputting section, i.e., a control panel (an operation section) 9 is used for instructing start of image formation in the image forming section main body 1 and start of reading of image information of an original by the image reading section 5 and is provided in a predetermined position of the image forming apparatus 101, for example, at a corner of rear side and left end or a of a corner of rear side and right end of the image reading section 5 with a swing arm 9b mounted on a mast 9a (the mast 9a is fixed at one of the corner of the above mentioned predetermined position). Namely the operation section 9 is positioned in a position that a position overlapped on a tray (paper exit (discharge) tray) 51 which holds the output image, i.e., the hard copy or the printout shown in FIG. 2A (top view). Also, the operation section 9 is positioned for example, at a front end of the image reading section 5 (not shown).

Figure 2:
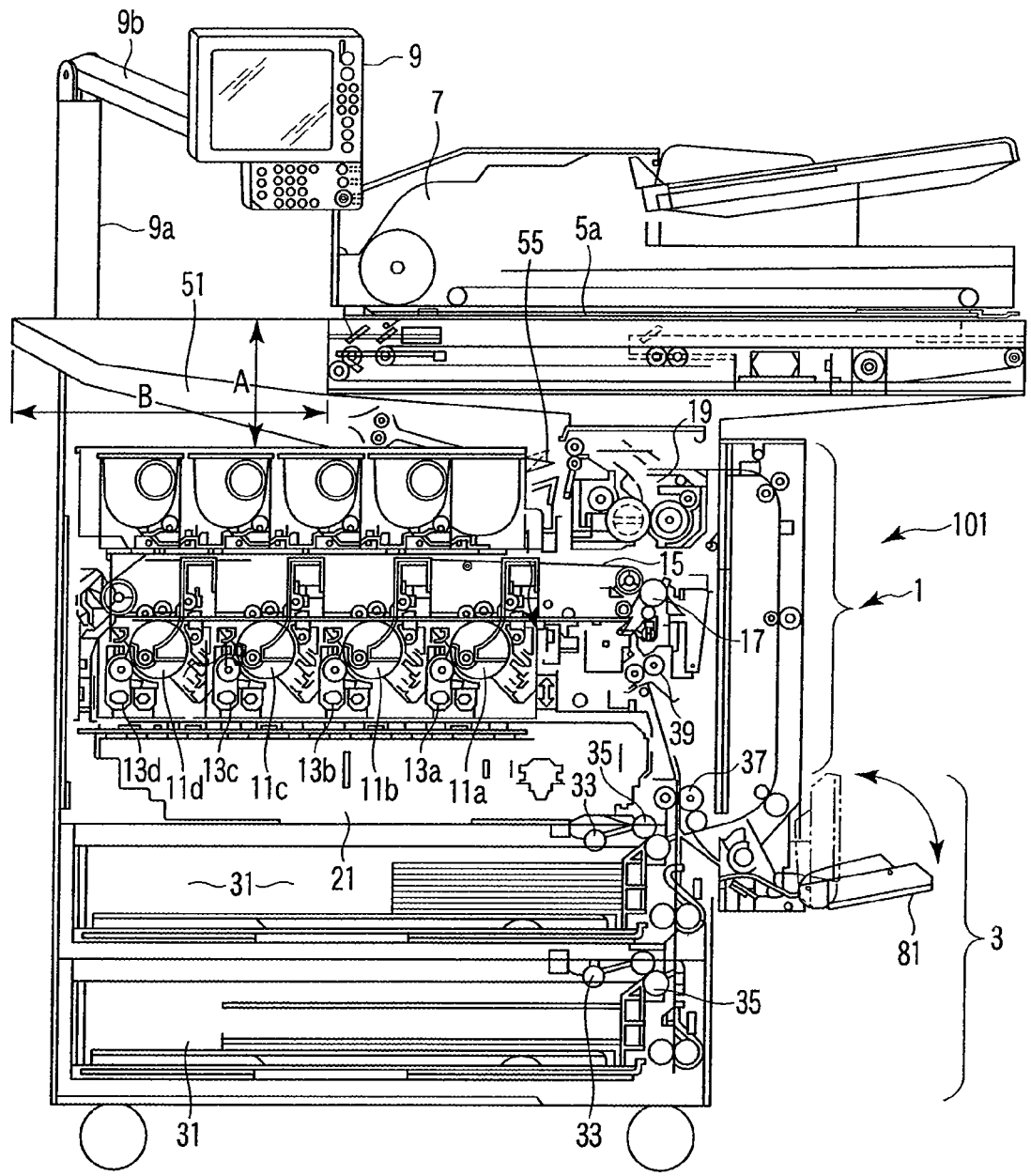
FIG. 2 is a schematic diagram showing an example of a path for a sheet material in the image forming apparatus explained with reference to FIG. 1.
Figure 2A:
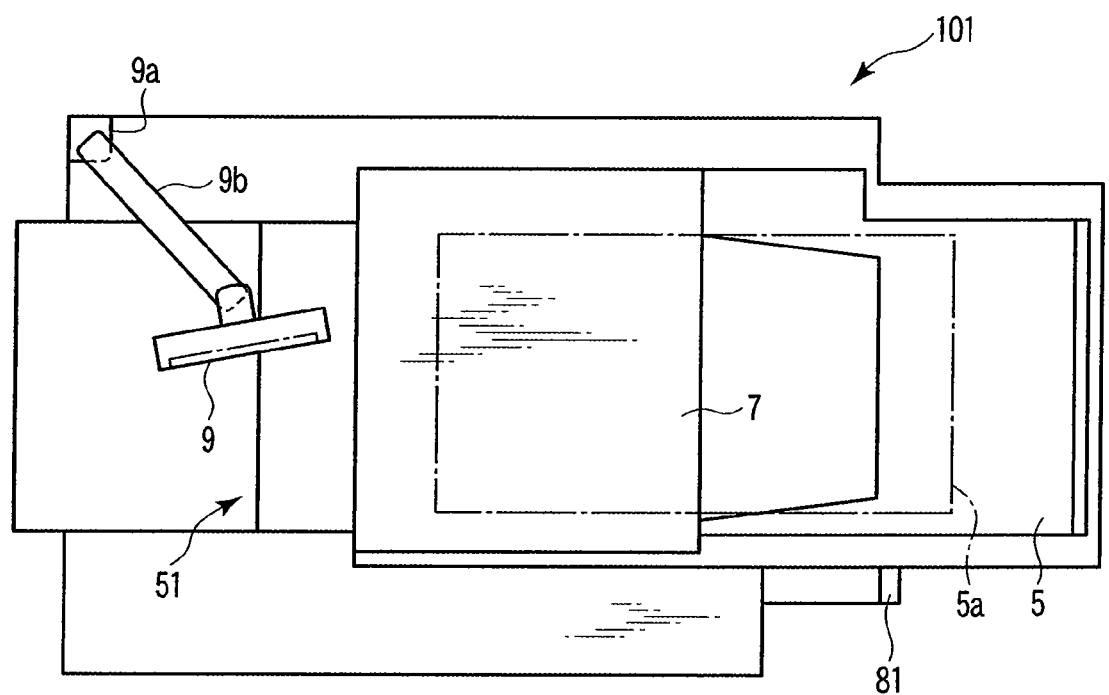
FIG. 2A is a schematic diagram (top view) showing the image forming apparatus explained with reference to FIGS. 1 and 2.

As schematically shown in FIG. 2, the image forming section main body 1 includes first to fourth photoconductive drums 11a to 11d each holds a latent image, first to fourth developing devices 13a to 13d each develops the latent image formed on the photoconductive drums 11a to 11d, a transfer belt 15 that holds and conveys images of each of developing material developed on the photoconductive drums 11a to 11d, a transfer device 17 that transfers the images of each of developing material developed and conveyed by the transfer belt 15 onto a sheet of an arbitrary size, which is an output medium, a fuser device 19 that fixes the image of the developing material on the sheet to which the image of the developing material is transferred by the transfer device 17, and an exposing device 21 that forms latent images on the photoconductive drums 11a to 11d.

As schematically shown in FIG. 2, the sheet feeding section 3 includes a cassette slot 31 that supports a cassette that contains sheets onto which images of developing material (toner images) are transferred from the transfer belt 15 holds the first to fourth toner (developing material) images formed on the first to fourth photoconductive drums 11a to 11d by the transfer device 17, each of cassettes that is set in the cassette slot 31 in a state in which a predetermined number of sheets of arbitrary sizes are stored therein and can feed the sheets one by one according to an image forming operation not described in detail, a pickup roller 33 that takes out the sheets from an arbitrary one of the cassette according to image formation not described in detail, and a separating mechanism 35 that forwards the sheets taken out by the pickup roller 33 to a sheet conveying path, which guides the sheets to a transfer position contact with the transfer device 17 and the transfer belt 15 where the images of the developing material are transferred onto the sheets from the transfer belt 15 by the transfer device 17, and prevents two or more sheets from being conveyed at a time. A plurality of the cassette slots 31, the pickup rollers 33, and the separating mechanisms 35 may be prepared when necessary. The each of cassettes can be arbitrarily inserted in the different slots 31.

An aligning roller 37 that aligns a sheet conveyed in the sheet conveying path and the images of the developing material conveyed by the transfer belt 15 are provided at one end of the sheet conveying path and in a predetermined position immediately before the transfer position where the images of the developing material are transferred onto the sheet from the transfer belt 15 by the transfer device 17.

An output image (a hard copy or a printout), image information of which is fixed on an output medium (a sheet) via the fuser device 19, is discharged (exit) to a discharged (exit) tray 51 defined between the image forming section main body 1 and an exit side of the output medium is discharged (exit) of the image forming section main body 1 defined on a side of the image reading section 5 (and above the image forming section main body 1). Namely, the tray 51 is defined in a shape dig down from an expanded space of a space including an original surface (although not described in detail, an upper surface of a glass 5a (see FIG. 2) of the image reading section 5 on which an original is set) to the tray 51 side (below the image reading section 5).

A relation between the depth [A] and the left-to-right direction length [B] of the second tray 61 is defined as "B>A".

Since the tray 51 is located on the side of the image reading section 5 in this way, the tray 51 is located in a position to which the heat from the fuser device 19 escapes (an upper part in a direction in which the heat naturally rises). Since an area where the image reading section 5, which is a heat source, overlaps the tray 51 is reduced above the tray 51 and an upper surface of the tray 51 forms an opening, discharged paper is cooled. Therefore, the discharged paper is prevented from curling and pieces of the discharge paper (the outputs) are prevented from sticking to one another. Moreover, since the upper surface of the tray 51 forms the opening, it is possible to easily check presence or absence of discharged paper.

In general, it is not so difficult to locate the image reading section 5 positioned upon the fuser device 19. Namely, the image reading section 5 is located on the fuser device 19, it is possible to equalize a load applied to a structure (the housing) around the fuser device 19.

In other words, since the fuser device 19 is arranged substantially in the center of a lower surface of the image reading section 5, the image reading section 5, which is inevitably supported at three points in the structure in which the lower surface of the image reading section 5 is a tray, can be stably fixed. Therefore, it is possible to perform stable image reading.

Figure 3:
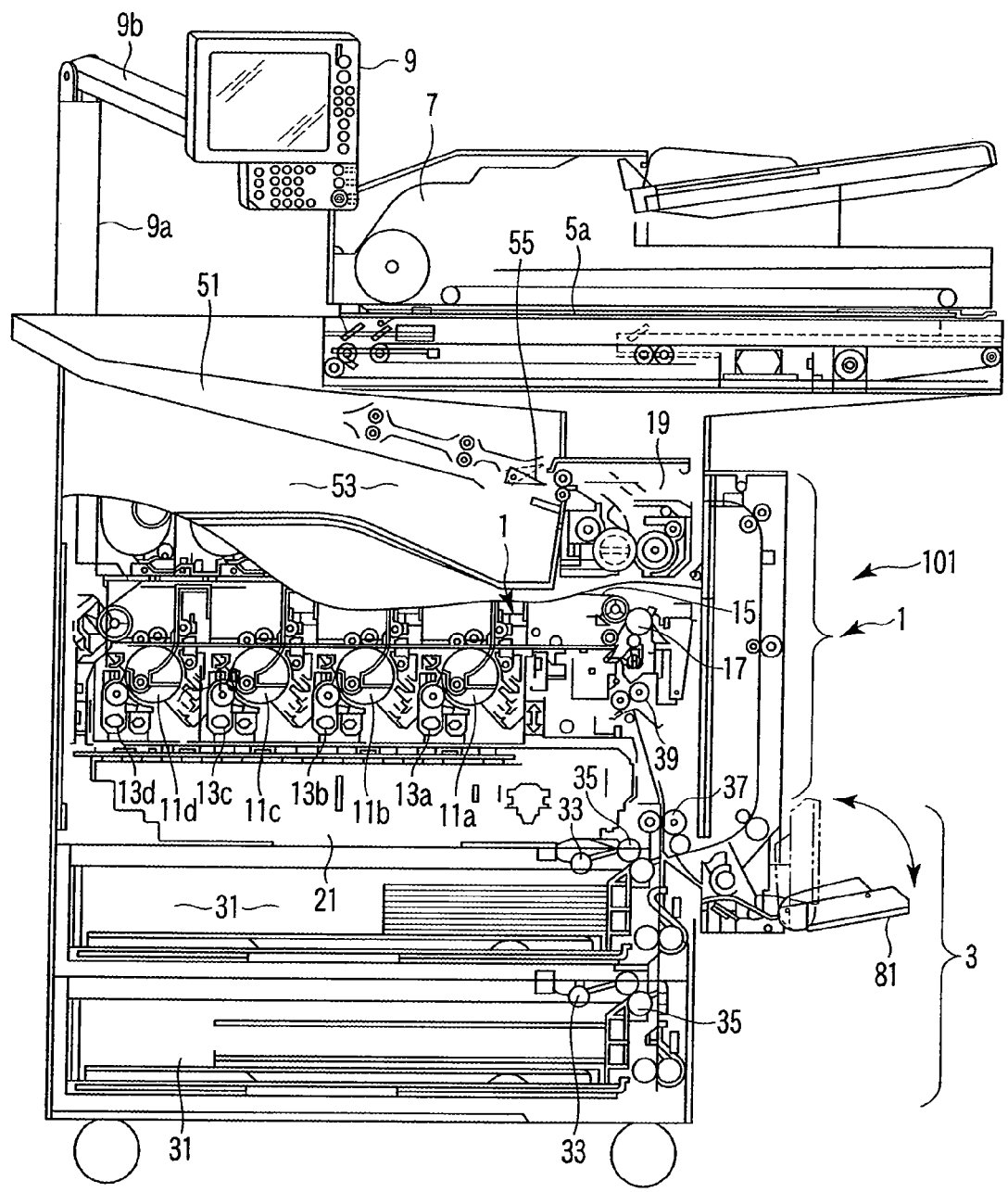
FIG. 3 is a schematic diagram showing an another example of an image forming apparatus according to embodiment explained with reference to FIGS. 1 and 2.

FIG. 3 is another example of the image forming apparatus shown in FIGS. 1 and 2.

The image forming apparatus shown in FIG. 3 includes the tray 51 and a second tray 53 which positions a space defined between the image forming section main body 1 and the image reading section 5. Namely, the second tray 53 defined on a side of the image reading section 5 and above the image forming section main body 1. The outputs of the output image onto the tray 51 or the second tray 53 is selected (changed) by a selecting element 55. The second tray 53 allows discharge the output image, when the second tray 53 is selected as a paper fixed onto the toner image, i.e., the output image (the hard copy or print out) discharging areas, it is possible to prevent the paper from being discharged to a position away from the user, since the second tray 53 is substantially located closer to the center of the image forming section main body 1 is viewed from the front (a left side near the center of the image forming section main body 1 is viewed from the front). In other words, the problem in that the user cannot take out paper unless the user turns around is solved.

Figure 4:
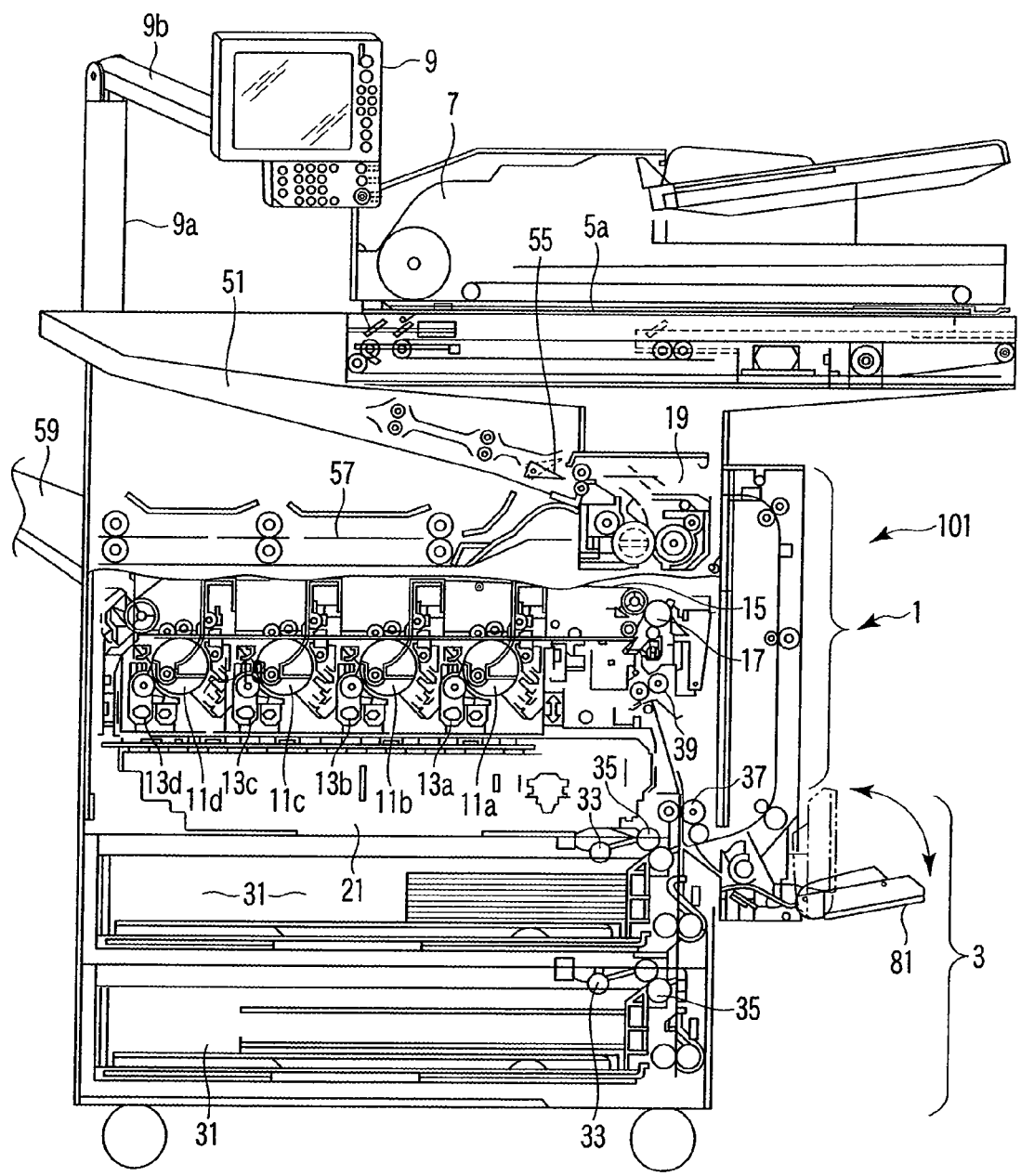
FIG. 4 is a schematic diagram showing a still another example of an image forming apparatus according to embodiment explained with reference to FIGS. 1 and 2.

FIG. 4 is a still another example of the image forming apparatus shown in FIGS. 1 and 2.

As shown in FIG. 4, an image forming apparatus 101 includes a side (exit) tray 59 and the tray 51 are located on the side of the image forming section main body 1. The output discharged from the fuser device 19 is conveyed into the side tray 59 through a relay conveying section 57 connects to a selecting element 55. Also, the paper discharge directions become identical on both of the side tray 59 and the tray 51 are easily taken out, since the side tray 59 and the tray 51 are located apart from a direction of plan view direction (left and right direction in view of front of the image forming apparatus). It is also possible to discharge the paper (the hard copy (the printout)) according to a quantity of the paper. For example, when the quantity is small, the paper can be discharged from the tray 51. When the quantity is large, the paper can be discharged from the side tray 59 of the side of the image forming apparatus 101.

Figure 5:
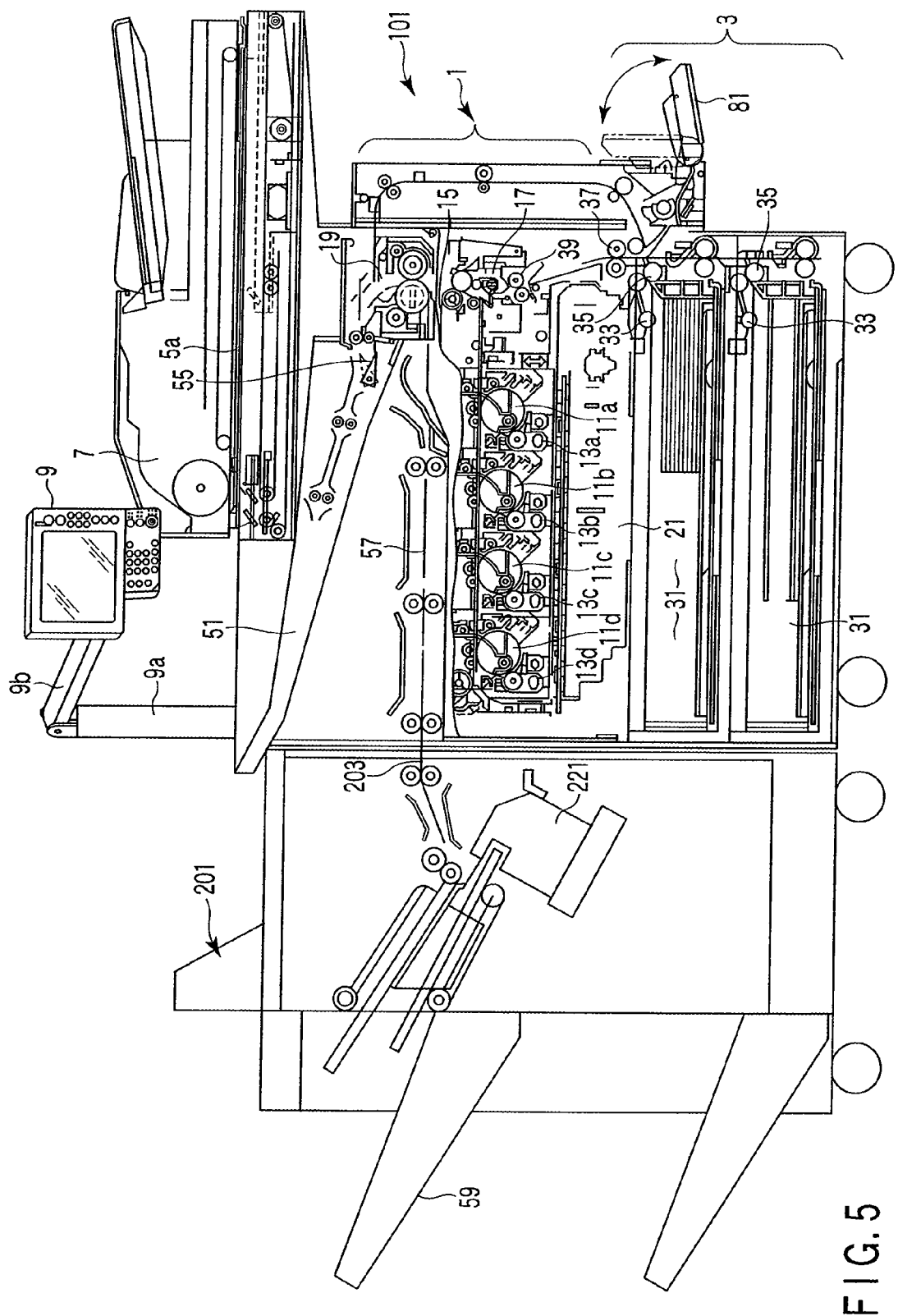
FIG. 5 is a schematic diagram showing a further another example of an image forming apparatus according to embodiment explained with reference to FIGS. 1 and 2.

FIG. 5 is a further another example of the image forming apparatus shown in FIGS. 1 and 2.

As shown in FIG. 5, for example, when an option such as a finisher 201 provided with a stapler 221 is attached, the side tray 59 shown in FIG. 4 is changed with the finisher 201. In this case, a hard copy (a printout) discharged from the fuser device 19 is conveyed to a sheet feeding section 203 through the relay conveying section 57 and the selecting element 55. However, the tray 51 is substantially located closer to the center of the image forming section main body 1 independently from the option such as the finisher 201 located on the side of the image reading section 5 in a state in which the image forming section main body 1 is viewed from the front. Therefore, when the tray 51 is selected as a paper discharge section, it is possible to prevent the hard copy (the printout) from being discharged to a position away from the user. In other words, the problem in that the user cannot take out paper unless the user turns around is solved.

Further, this makes it possible to sort out, even when the option such as the finisher 201 is added, discharged paper from a copying machine, a facsimile, a printer, and the like because the paper discharge tray is also provided on the image forming section main body 1 side. This also makes it possible to take out, on the upper surface, special (irregular type) paper such as long paper and wide paper (or a sheet for an OHP, etc.). Therefore, the irregular type paper is prevented from being caught (in conveying paths to the image forming section main body 1 and the finisher 201). Even the special (irregular type) paper is easily taken out.

Figure 6:
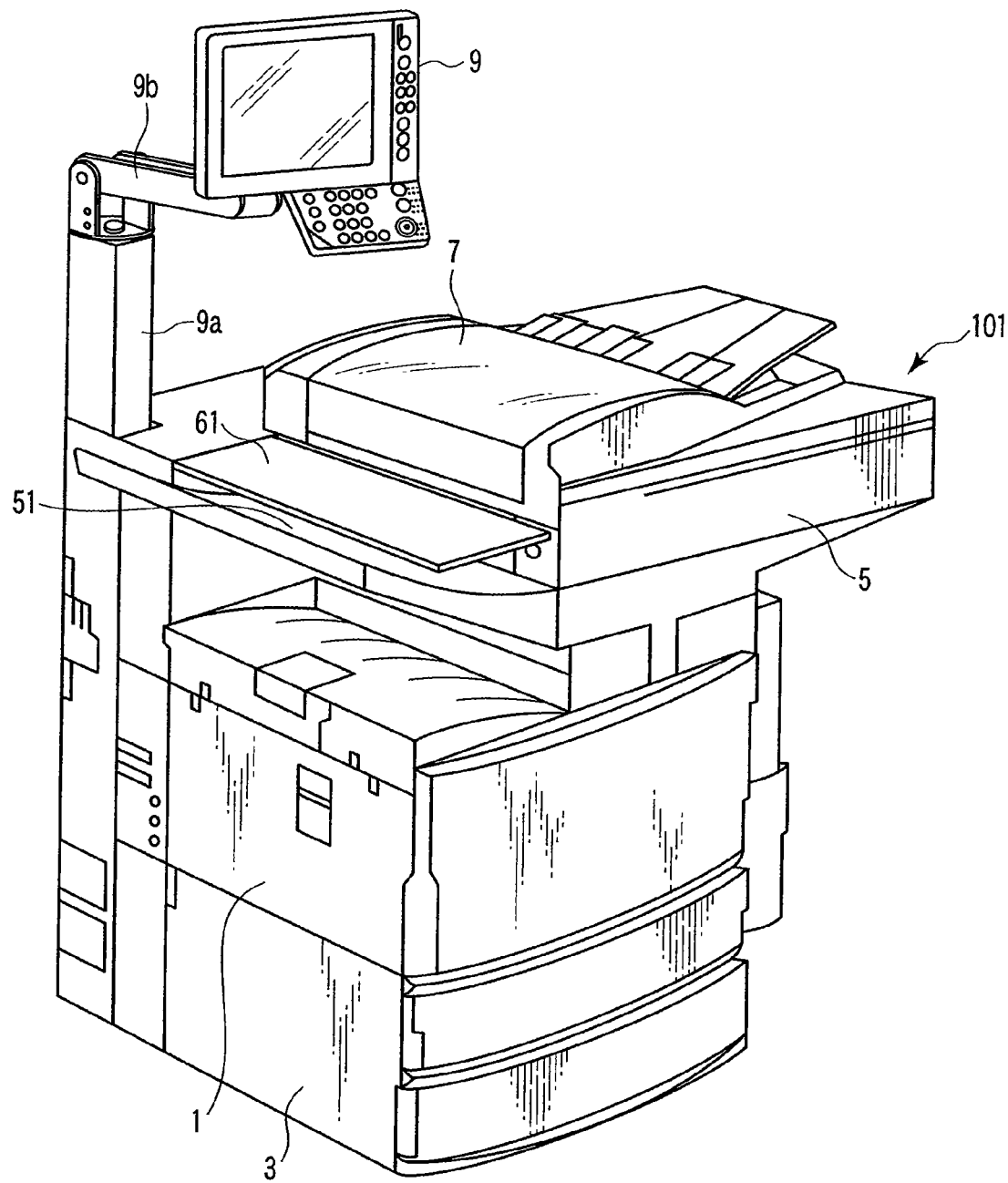
FIG. 6 is a schematic diagram showing a still another example of an image forming apparatus according to embodiment explained with reference to FIGS. 1 and 2.

FIG. 6 is a still further another example of the image forming apparatus shown in FIGS. 1 and 2.

As shown in FIG. 6, a flat area 61 is provided substantially equal height to the original surface 5a of the image reading section 5 and is extended to cover a part of the tray 51. This makes it possible to secure a flat copy work area on the tray 51. In other words, a part of the tray 51 is covered to make it possible to provide a space where an original to be copied can be placed. Also, the flat area 61 is provided an opening on the tray 51 is secured. This makes it possible to efficiently cool discharged paper.

Figure 7:
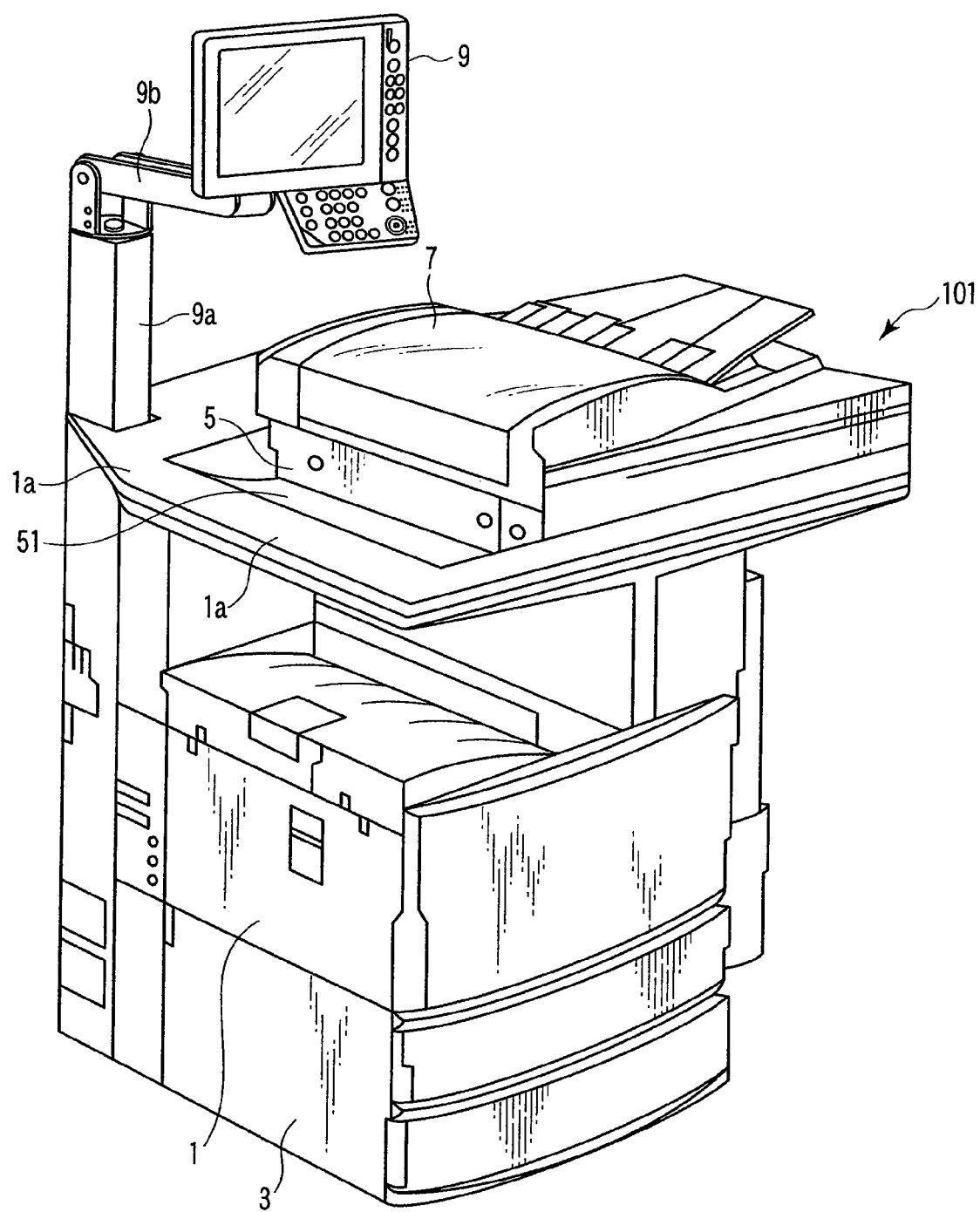
FIG. 7 is a schematic diagram showing a further another example of an image forming apparatus according to embodiment explained with reference to FIGS. 1 and 2.

Moreover, as shown in FIG. 7, a cover member 1a surrounding the original (holding table) glass 5a (see FIG. 2) of the image reading section 5 and the image forming section main body 1 may be formed integrally in place of the flat area 61 shown in FIG. 6. The cover member 1a makes it possible to secure a flat copy work area on the tray 51, also.

Further, as shown in FIG. 8, the cover member 1a surrounding the original (holding glass) table 5a of the image reading section 5 and the flat area 61 are formed integrally. Namely, a surface of the flat area 61 and a surface of the cover member 1a are substantially equal height with the original holding glass surface (table) 5a of the image reading section 5. This makes it possible to secure a flat copy work area where an original to be copied can be placed.

Figure 9:
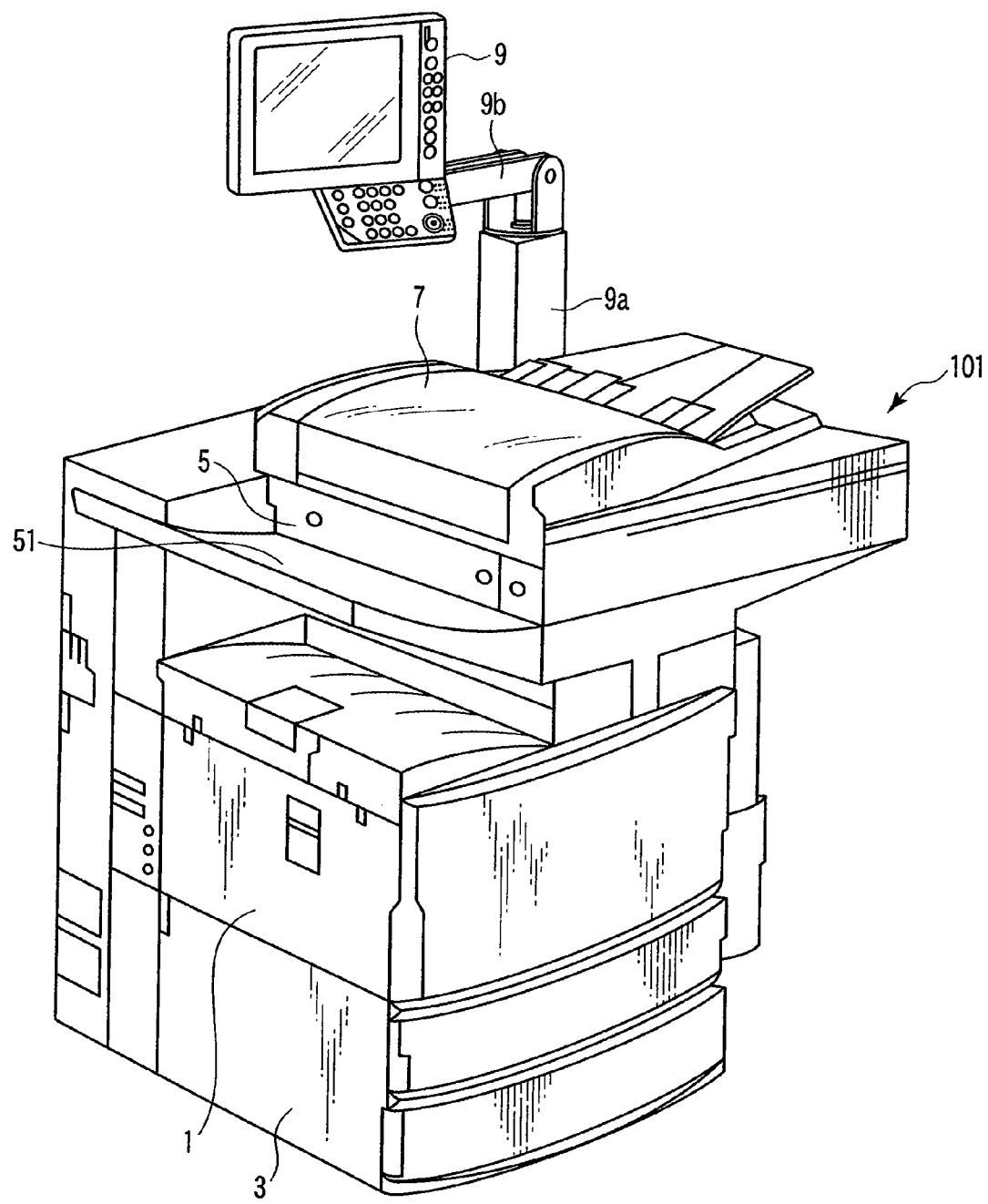
FIG. 9 is a schematic diagram showing a further another example of an image forming apparatus according to embodiment explained with reference to FIGS. 1 and 2.

FIG. 9 is a further another example of the image forming apparatus shown in FIGS. 1 and 2.

As shown in FIG. 9, the operation section 9 is arranged in a predetermined position of the image forming apparatus 101, for example, at a corner of rear side and right end of the image reading section 5 that is a position apart from the tray 51.

Figure 10:
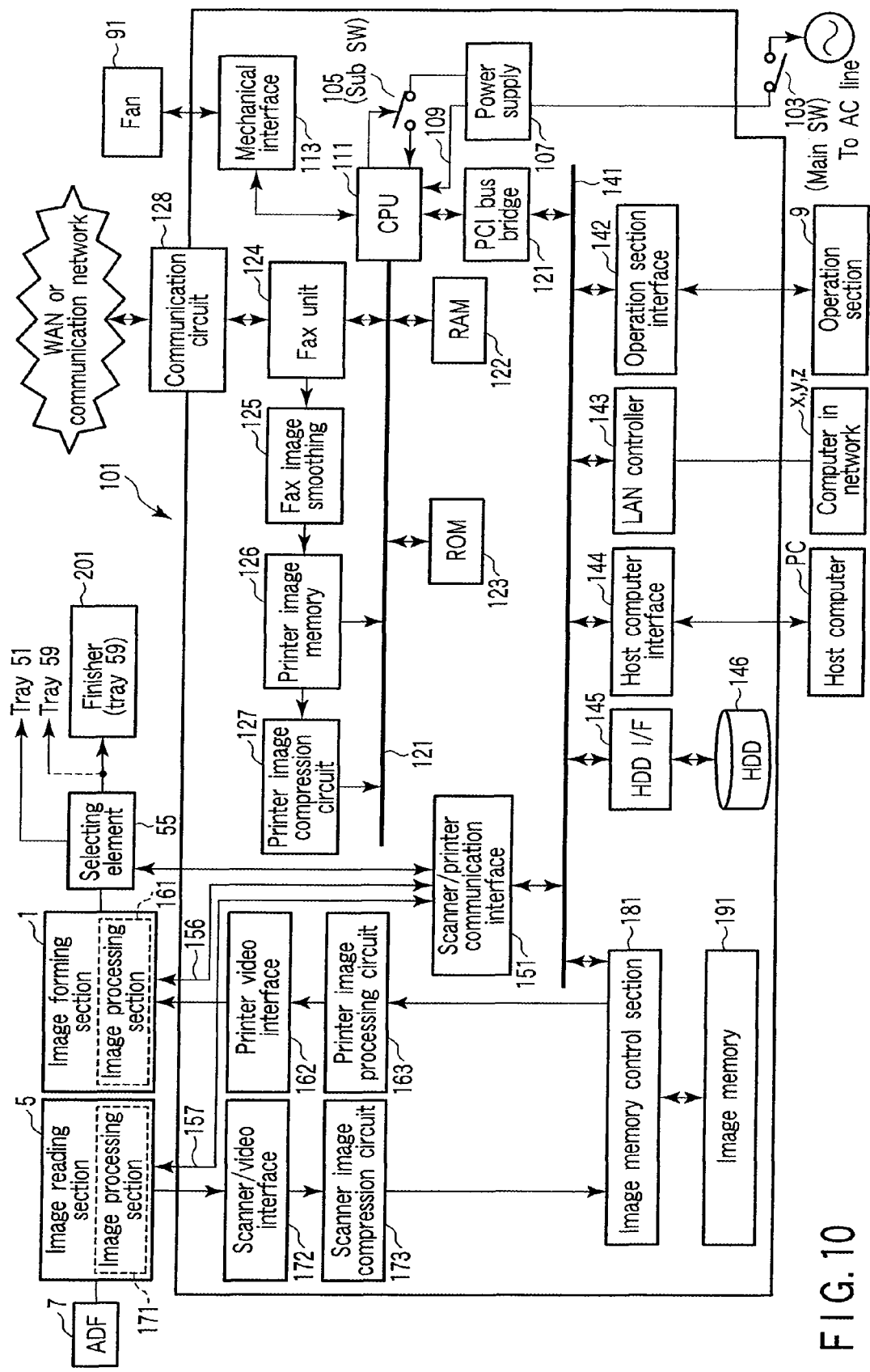
FIG. 10 is a schematic diagram showing an example of functional blocks for actuating the image forming apparatuses shown in FIGS. 1 to 9 and 2A.

Schematic blocks for actuating the image forming apparatuses explained with reference to FIGS. 1 to 9 and 2A are shown in FIG. 10.

The image forming apparatus 101 has the image forming section main body 1, the sheet feeding section 3, and the image reading section 5.

Figure 12:
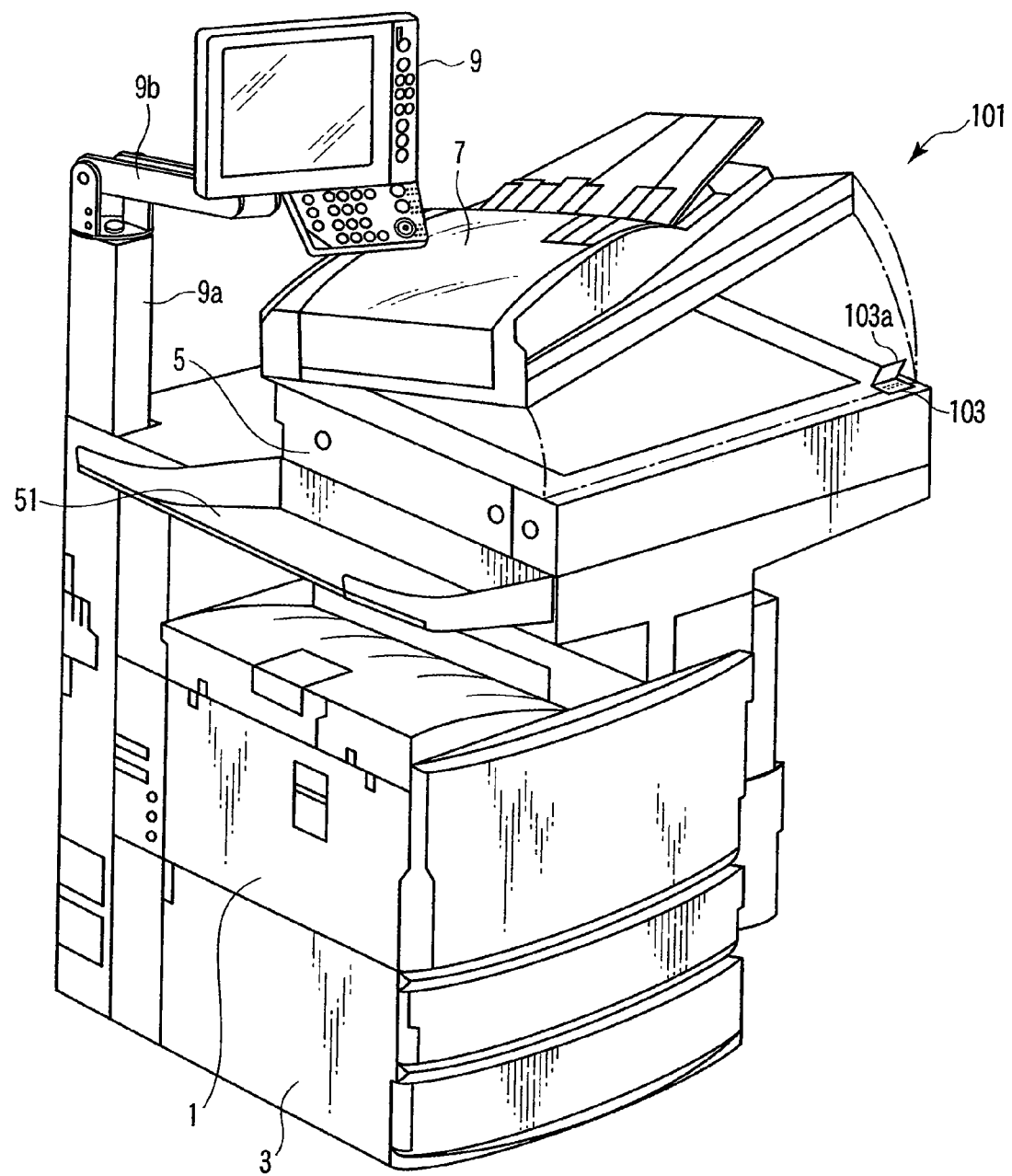
FIG. 12 is a schematic diagram showing positions of a main switch incorporated in the image forming apparatus shown in FIGS. 1 to 9 and 2A and a cover that covers the main switch and a state in which an automatic document feeder (ADF) is opened from an image reading section.

In a predetermined position of the image forming apparatus 101, for example, on a rear surface of the image forming section main body 1, as schematically shown in FIG. 12, a circuit board 311 including a main control block (CPU) 111, a CPU local bus 121 connected to the CPU 111, a PCI (Peripheral Component Interconnect) bus bridge 131 connected to the CPU 111, and a PCI bus 141 connected to the PCI bus bridge 131 is provided.

For example, a RAM 122 and a ROM 123 are connected to the CPU local bus 121. The RAM 122 is used as a program memory and a data storage area used by the CPU 111 to execute processing. The ROM 123 is used as a storage area for a boot program necessary for system startup and programs and fixed data used by the CPU 111 to realize various functions. The programs and the data on the ROM 123 may be stored as compressed data in the ROM 123 and expanded in the RAM 122 and executed.

The image forming section main body (a printer section) 1 and the image reading section (a scanner section) 5 are connected to the PCI bus 141 through a scanner and printer communication interface (I/F) 151.

The operation section (an instruction inputting and displaying section) 9 is connected to the PCI bus 141 through an operation section interface (I/F) 142. Although not described in detail, the operation section 9 includes a touch panel sensor used for an operation (on and off) instruction, a mode selection (a selection instruction), a numerical value input, a function selection (a selection input), and the like by the user, a graphical display that can display indications corresponding to the instructions by the touch panel sensor, a response screen responding to the selection input, and the like, dedicated buttons (input keys) frequently used for input (deposit) of numbers such as the number of copies (prints), start and cancel, and the like, and a state display LED. In the operation section 9, the user can set to which of the tray 51 and the side tray 59 (the tray 59 of the finisher 201 when the finisher 201 is connected) a sheet P, onto which an image is outputted, should be discharged.

Arbitrary computers and other MFPs (Multi-Functional Peripherals) x, y, and z present on a network are connected to the PCI bus 141 through a LAN (Local Area Network) controller 143.

An external apparatus, for example, a host computer PC is also connected to the PCI bus 141 through a host computer interface (I/F) 144. The host computer interface (I/F) 144 is a well-known interface such as the Ethernet (registered trademark), the USB (Universal Serial Bus), the IEEE 1284, and the IEEE 1394.

An HDD (Hard Disk Drive) 146 that can store large volume data is also connected to the PCI bus 141 through an HDD (Hard Disk Drive) interface (I/F) 145. The image forming apparatus 101 can also perform FAX communication using a WAN or a communication network, to which the image forming apparatus 101 can be connected through a communication line 128, via a FAX unit 124 connected to the CPU local bus 121.

The main control block 111 exchanges control signals with each of the image forming section main body 1 and the image reading section 5 connected thereto through the scanner and printer communication interface (I/F) 151 to thereby control an operation of the image reading section 5 to read color or black and white image data and control the image forming section main body 1 to output color or black and white image data.

The read image data is once stored in an image memory 191. Therefore, by reading an original image only once, it is possible to perform repeated output of a necessary number of sheets of the image (output of plural sheets), "N in 1" output for reducing images of plural images and arranging the images on one sheet, image rotation for making it possible to perform arbitrary collation in 90 degree units of the original image, form combination for forming a document and journal frame and the like in the read image, combination of a date, a logo, or a watermark, and the like.

The read image data is compressed by encoding processing in an image processing section 171 or an image memory control section 181 when necessary. Consequently, it is possible to reduce an image data volume stored in the HDD 146. By compressing the image data, it is possible to store a larger volume of image data in the HDD 146. By outputting the image data, which is once stored in the HDD 146, in arbitrary order and an arbitrary number of times, it is possible to perform output (printout) of a requested arbitrary number of sheets (number of copies) called electronic sort.

The scanner and printer communication interface (I/F) 151 exchanges control information such as a command and a status with each of the image forming section main body 1 and the image reading section 5 through serial communication 157 with the scanner (the image reading section) 5 and serial communication 156 with the printer section (the image forming section main body) 1. Consequently, it is possible to notify the CPU 111 of information such as start and operation states of the image forming apparatus 101, acquisition of a size and a type of a read original, designation of a sheet size, and residual amounts of toners, sheets, and the like. The scanner and printer communication interface (I/F) 151 outputs a switching signal to the selecting element 55 in order to discharge the sheet P to the tray 51 or the side tray 59 (the side tray 59 of the finisher 201) as instructed by the user using the operation section 9. As the selecting element 55, it is possible to use various well-known switching devices such as a solenoid switched to the relay conveying path 57 (the side tray 59) in a non-operation time and an electromagnet for switching a guide member (not described in detail) to a direction of the side tray 59 or the tray 51 in an operation time. It goes without saying that, for example, a mechanical switching mechanism may be provided in the finisher 201 (or the image forming section main body 1) and the user may directly actuate the switching mechanism.

The image forming apparatus (MFP) 101 can receive image data for image output from peripheral (external) apparatuses connected through various kinds of connection such as local connection of the IEEE 1284, the IEEE 1394, and the USB (connection through the host computer interface (I/F) 144), LAN connection through the LAN controller 143, and connection to a communication network and a WAN (Wide Area Network) through the public line 128 connected to the FAX unit (modem) 124 and outputs (print outs) the image data.

Near the circuit board 311 including the main control block (CPU) 111, as explained later with reference to FIGS. 12, 13A to 13C, and 14 to 19, at least one of fan 91 for cooling the CPU 111 and the HDD 146, which have relatively large heating values, is provided. The fan 91 is connected to the CPU 111 through the motor driver (a mechanical controller) 113 and rotated at a predetermined number of revolutions or maintained stopped on the basis of on and off control by the CPU 111.

Most of the elements in the circuit board 311 including the main control block (CPU) 111 are actuated at DC±12V and DC±5V supplied via a power supply 107. At a pre-stage (on an AC input side) of the power supply 107, a main switch 103 that directly interrupts an AC input according to operation (an on and off operation) is provided. At a post-stage (on a CPU 111 side) of the power supply 107, a sub-switch 105 that interrupts a power supply according to an instruction by the CPU 111 is provided. Usually, a secondary power supply 109 that provides a predetermined voltage to allow the main control block 111 to operate unless the main switch 103 is turned off is connected to the CPU (the main control block) 111.

In the image forming apparatus 101 described above, the image data read by the image reading section 5 is inputted to a scanner image compression circuit 173 through a scanner video interface (I/F) 172 and, after being compressed by the scanner image compression circuit 173, stored in the image memory 191 through the image memory control section 181.

A printer image processing circuit 163 converts the image data into a necessary common image format requested in the image forming section main body 1 and outputs the image data to the image forming section main body 1 through a printer video interface (I/F) 162. In an image processing section 161 of the image forming section main body 1, the image data on the image memory 191 is encoded or decoded. Reversible variable-length coding (rule) is used for this encoding and decoding.

The image memory control section 181 controls the large-capacity image memory 191 that can store code data of a non-compressed image or a compressed image. The image memory control section 181 controls readout of image data from the scanner 5 to the image memory 191 and print output of image data from the image memory 191 to the printer.

The image memory control section 181 is applicable to handling of image data of various formats. The image memory control section 181 can select an optimum compression system according to a function in use in association with image data of each of a monochrome image and a color image in binary images and image data of monochrome and color of a copy function and a network printer function in multi-value images.

For example, when the user requests, through the host computer PC, the image forming apparatus 101 to perform printout, a control signal is inputted from the host computer PC to the main control block (CPU) 111 through the host computer interface (I/F) 144.

Image data that should be printed out is stored in the image memory 191 through the PCI bus 141 and the image memory control section 181.

The image data stored in the image memory 191 is supplied to the printer image processing circuit 163 (through the image memory control section 181) at predetermined timing according to the control by the CPU 111.

The image data supplied to the printer image processing circuit 163 is inputted to the image processing section 161 of the image forming section main body 1 through the printer video interface (I/F) 162 and converted into raster data that should be outputted from the exposing device 21.

Thereafter, image lights (exposure lights) corresponding to the first to fourth image data are outputted from the exposing device 21 to the photoconductive drums 11a to 11d. Consequently, the electrostatic images (four of electrostatic latent images) corresponding to the exposure lights from the exposing device 21 are formed on the photoconductive drums 11a to 11d, respectively.

Each of the electrostatic latent images formed on the photoconductive drums 11a to 11d are developed and visualized with toner stored in the developing devices 13a to 13d, respectively.

Each of the toner images, i.e., the output images on the photoconductive drums 11a to 11d are transferred onto the transfer belt 15 and conveyed to the position to transfer the toner images on the sheet (sheet material), i.e., the sheet P, which is only one sheet pulled out from any one of the cassettes by the paper feeding roller 33 and the separation rollers 35 and conveyed to the transfer device 17 through the conveying path, by the transfer device 17.

The toner images (the output images) transferred onto the sheet P is fixed on the sheet P by the fuser device 19.

The sheet P which holds the fixed toner images thereon is conveyed to the selecting element 55 and discharged to the side tray 59 (finisher 201) or the tray 51 designated by the user in advance. When a paper discharge tray is not specifically designated (selected) by the user, the sheet P is discharged to the tray 51.

On the other hand, when the user instructs reading of image information from a sheet-like medium, i.e., an original and image formation, i.e., copying using the image reading section 5 (the ADF 7) in the image forming apparatus 101, the image information of the original is captured as light and shade of light by the image reading section 5. In other words, although not shown in the figure, reflected light (light and shade of light) from the original illuminated by a not-shown illuminating device is converted into an image signal, for example, by a CCD sensor and subjected to predetermined correction by the image processing section 171.

The image signal subjected to the predetermined correction by the image processing section 171 is inputted to the scanner image compression circuit 173 through the scanner video interface (I/F) 172.

The image signal, which is the image information of the original compressed by the scanner image compression circuit 173, is stored in the image memory 191 through the image memory control section 181.

Image data stored in the image memory 191 is supplied to the printer image processing circuit 163 (through the image memory control section 181) at predetermined timing according to the control by the CPU 111.

The image data supplied to the printer image processing circuit 163 is inputted to the image processing section 161 of the image forming section main body (the printer) 1 through the printer video interface (I/F) 162 and converted into raster data that should be outputted from the exposing device 21.

Thereafter, through a process same as the printout already explained, a toner image corresponding to the image information of the original is formed and transferred onto the sheet P conveyed through the conveying path at predetermined timing.

The sheet P having the toner image fixed thereon by the fuser device 19 is discharged to the tray 59 through the selecting element 55 except a case in which paper discharge to the side tray 59 of the finisher 201 or the tray 51 is selected (designated) by the user.

Consequently, hard copies on which the image of the original read by the image reading section 5 is copied (duplicated) are stacked on the tray 51 of the image forming section main body 1 in order. In other words, copies obtained by copying the original image information are discharged to the vicinity of the original reading section 5 relatively close to a work location of the user. This allows the user to easily take out (carry back) the copies (the hard copies) without moving from the vicinity of the main body of the image forming apparatus 101 in order to take out (carry back) the copies.

Figure 11:
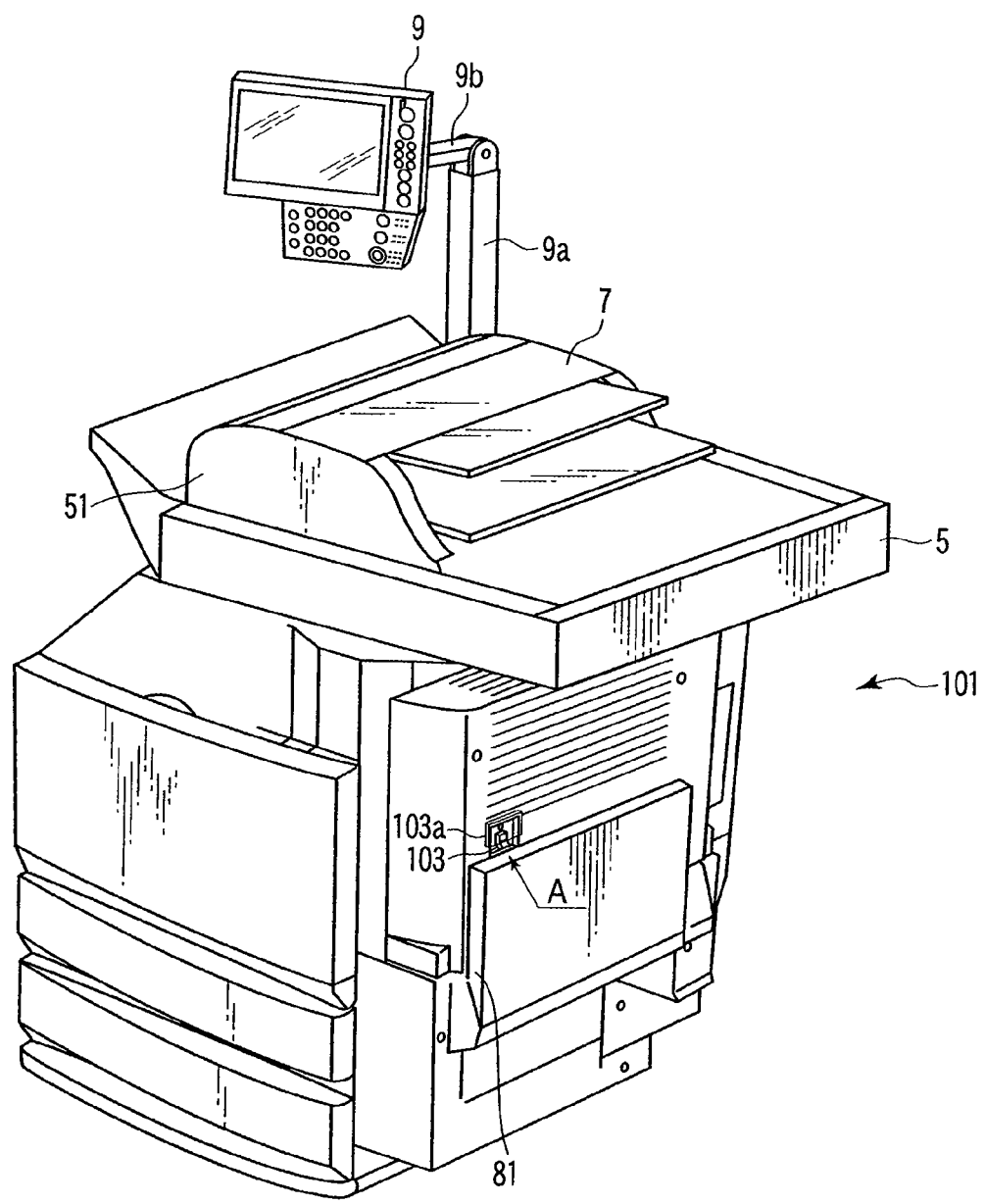
FIGS. 11 and 11A are schematic diagram showing positions of a main switch incorporated in the image forming apparatus shown in FIGS. 1 to 9 and 2A and showing a relationship of a cover that covers the main switch and a bypass unit that swings to or from the main body of the image forming section.
Figure 11A:
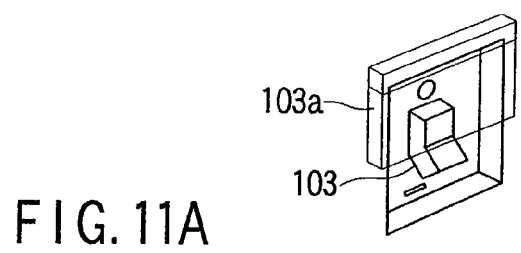

FIGS. 11 and 11A show relationship of positions of the main switch 103 and a cover 103a that covers the main switch 103 and a manual feed (bypass) tray 81 is in a "closed position".

The main switch 103 shown in FIGS. 2, 3 to 5 is arranged where the user can turn off the main switch 103 with an operation in an area of usually performed work, for example, a position where the user cannot directly touch the main switch 103 like when the manual feed (bypass) tray 81 used for the supply of a sheet material(s) of an arbitrary size is in a "closed position".

The main switch 103 is originally arranged in a position with high visibility on the front side of the image forming apparatus 101. On the other hand, in general, a dedicated cover is provided to prevent the main switch 103 from being touched by mistake during copy work. However, nowadays, since the HDD 146 and the like are mounted, there is also an image forming apparatus put to practical use in which the main switch 103 that interrupts the power supply of the image forming apparatus 101 in terms of hardware is not used except in an emergency and, for example, after a system is finished by operation from a liquid crystal panel on the operation panel 9, the main switch 103 is turned off. There is also an example in which the sub-switch 105 is located on a front surface or in a position with high visibility of the image forming apparatus 101 and the main switch 103 is arranged in a (relatively) deep position where the user needs to intentionally push the main switch 103 to interrupt energization.

FIG. 12 shows relationship of positions of the main switch 103 and a cover 103a that covers the main switch 103 and an ADF 7 be operated by displacing (opening) the ADF 7 (or the not-shown original press) used integrally with the image reading section 5 from a "closed position".

In the image forming apparatus shown in FIG. 12, the main switch 103 can be operated by displacing (opening) the ADF 7 (or the not-shown original press) used integrally with the image reading section 5 from a "closed position" for covering the original glass 5a of the image reading section 5 to an "open position" for setting an original on the original glass 5a of the image reading section 5.

When the ADF 7 is in the "closed position", the user is prevented from directly touching the main switch 103, since the main switch 103 is covered with the cover 103a. On the other hand, when it is necessary to turn off the main switch 103 at the time of an emergency or the like, the user can turn off the power supply with an operation in an area of usually performed work (in the example in FIG. 12, opening of the ADF 7) while securing visibility of the main switch 103. The cover 103a does not have to be provided when the main switch 103 is arranged in depth and an area of the main switch 103 covered by an outer frame of the ADF 7 is increased.

In this way, the main switch 103 and the sub-switch 105 are provided and the user can turn off the main switch 103 with an operation in an area of usually performed work, in the example in FIGS. 11 and 11A, opening of the bypass tray 81 and the example of in FIG. 12, opening the ADF 7. Meanwhile, at the time of an emergency when the power supply has to be interrupted at once, the user can open the bypass tray 81 or the ADF 7, and open the cover 103a exclusively used for turn off the main switch 103 and turn off the power supply (by turning off the main switch 103). When the bypass tray 81 or the ADF 7 is closed, since the cover 103a exclusively used for the power SW cannot be opened because the cover 103a is pressed (covered). Therefore, if usual power off work is performed during this operation, the user can notice the sub-switch 105 provided on the operation panel 9 or provided near the operation panel 9 side for example and operate the sub-switch 105.

Figure 13:
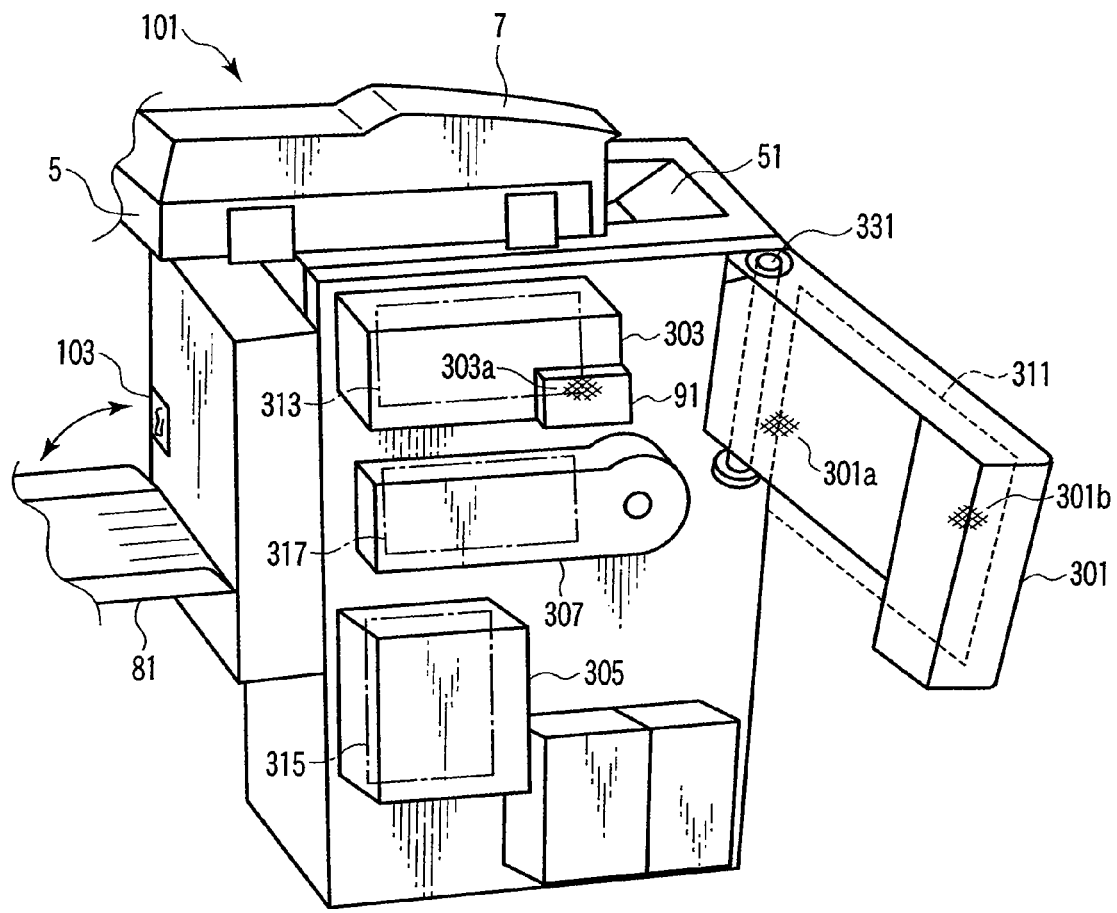
FIG. 13 is a schematic diagram showing a state in which a cover member on a rear surface of the image forming apparatus is removed and the image forming apparatus shown in FIGS. 1 to 9 and 2A is viewed from the rear surface.

FIG. 13 shows a state in which a cover member on the rear surface of the image forming apparatus 101 is removed and the image forming apparatus 101 is viewed from the rear surface.

As shown in FIG. 13, in the state in which the image forming apparatus 101 is viewed from the rear surface, the plurality of circuit boards 311, 313, 315 and 317 each holds the circuit components such as the main control block (CPU) 111 and the group of electronic components such as the HDD 146 schematically shown in FIG. 10 is arranged, for example, are housed in shield cases 301, 303, 305 and 307. At least one of the shield case, for example, the shield case 301 can be opened (turned) to an outer side (the rear surface) of the image forming apparatus 101 with a fulcrum 331 as a rotation center shown in FIG. 13. A fan 91 is provided between the shield case 301 and the shield case 303, for example. The fan 91 is located (housed) may be, for example, in the shield case 303 shown in FIG. 14A, or housed (located) may be, for example, in the shield case 301 shown in FIG. 14B. Also, the fan 91 is located a space defined between the shield cases 301 and 303, independently. When the shield case 301 is opened from the shield case 303 with the fulcrum 331 as a rotation center shown in FIG. 15A, the fan 91 locates the space defined between the shield cases 301 and 303 as shown in FIG. 14C, is separated from the shield case 303 (the image forming apparatus 101) by contact with the shield case 301. Also, as shown in FIG. 15B, when the shield case 301 is opened from the shield case 303, the fan 91 is removed (away) from the shield case 301 remaining with the shield case 303.

Figure 14A:
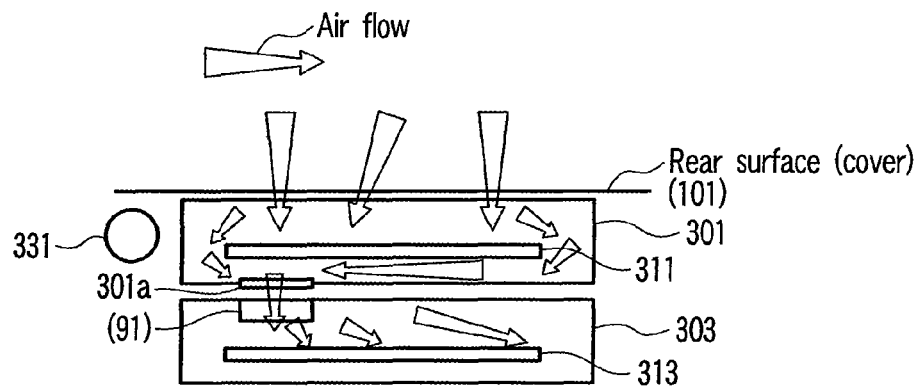
FIGS. 14A to 14C are schematic diagrams for explaining examples of a positional relation between shield cases and a fan arrayed in a depth (front to rear) direction.
Figure 14B:
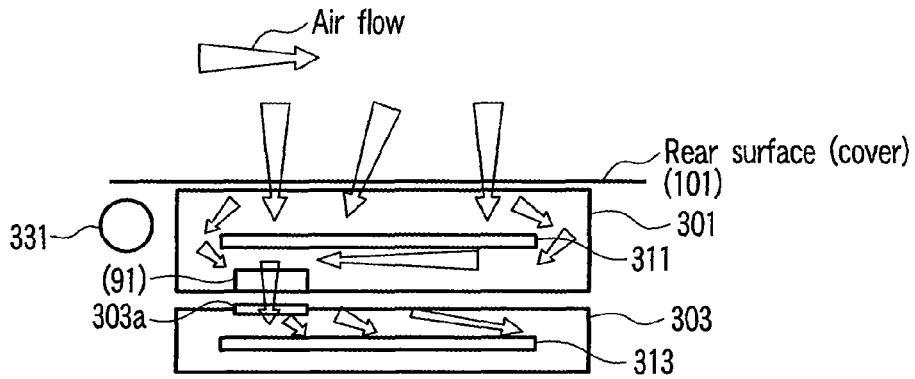
Figure 14C:
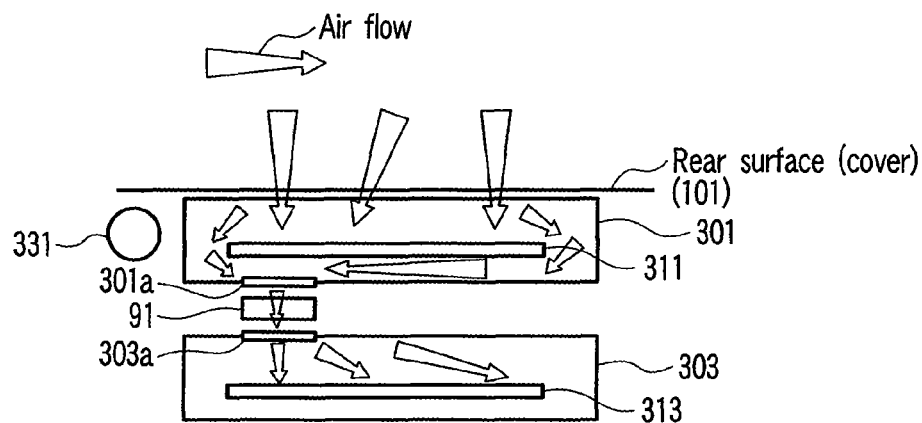

FIGS. 14A to 14C show examples of air flow build of the arrangements of the fan shown in FIG. 13.

As it is evident from FIG. 14A, the air flow (the cooling wind) flowing (being sucked) from a rear surface (cover) side of the image forming apparatus 101 into the shield case 301 on the outer side is guided to the air hole 301a along front and rear surfaces (two surfaces) of the circuit boards 311, which housed in the shield case 301, by an action of the fan 91 adjacent to the air hole 301a formed on a non-rear surface side of the shield case 301 (on the shield case 303 side on the inner side).

The air flow (the cooling wind) sucked out from the air hole 301a by the fan 91 is guided into the shield case 303 located on the inner side of the shield case 301, cools the inside of the shield case 303 along the front and rear surfaces (the two surfaces) of the circuit board 313 housed in the shield case 303, and is discharged to the outside, for example, the bottom surface of the image forming apparatus 101 from a not-shown air hole of the shield case 303.

FIG. 14B is an example in which the fan 91 shown in FIG. 13 is located in the shield case 301.

With reference to FIG. 14B, the air flow (the cooling wind) flowing (being sucked) from a rear surface (cover) side of the image forming apparatus 101 into the shield case 301 on the outer side is guided to the fan 91 along front and rear surfaces (two surfaces) of the circuit boards 311, which housed in the shield case 301, by an action of the fan 91 formed on a non-rear surface side of the shield case 301 (on the shield case 303 side on the inner side).

The air flow (the cooling wind) sucked out by the fan 91 is guided into an air hole 303a locates the shield case 303 arranged at the inner side of the shield case 301, cools the inside of the shield case 303 along the front and rear surfaces (the two surfaces) of the circuit board 313 housed in the shield case 303, and is discharged to the outside, for example, the bottom surface of the image forming apparatus 101 from a not-shown air hole of the shield case 303.

FIG. 14C shows an example of arrangement of the fan between the outer shield case 301 and the inner shield case 303.

It goes without saying that, in the examples shown in FIGS. 14A to 14C, as in the examples described above, positions of the fans and a flow of the air (the cooling air) can be arbitrarily set.

Figure 16:
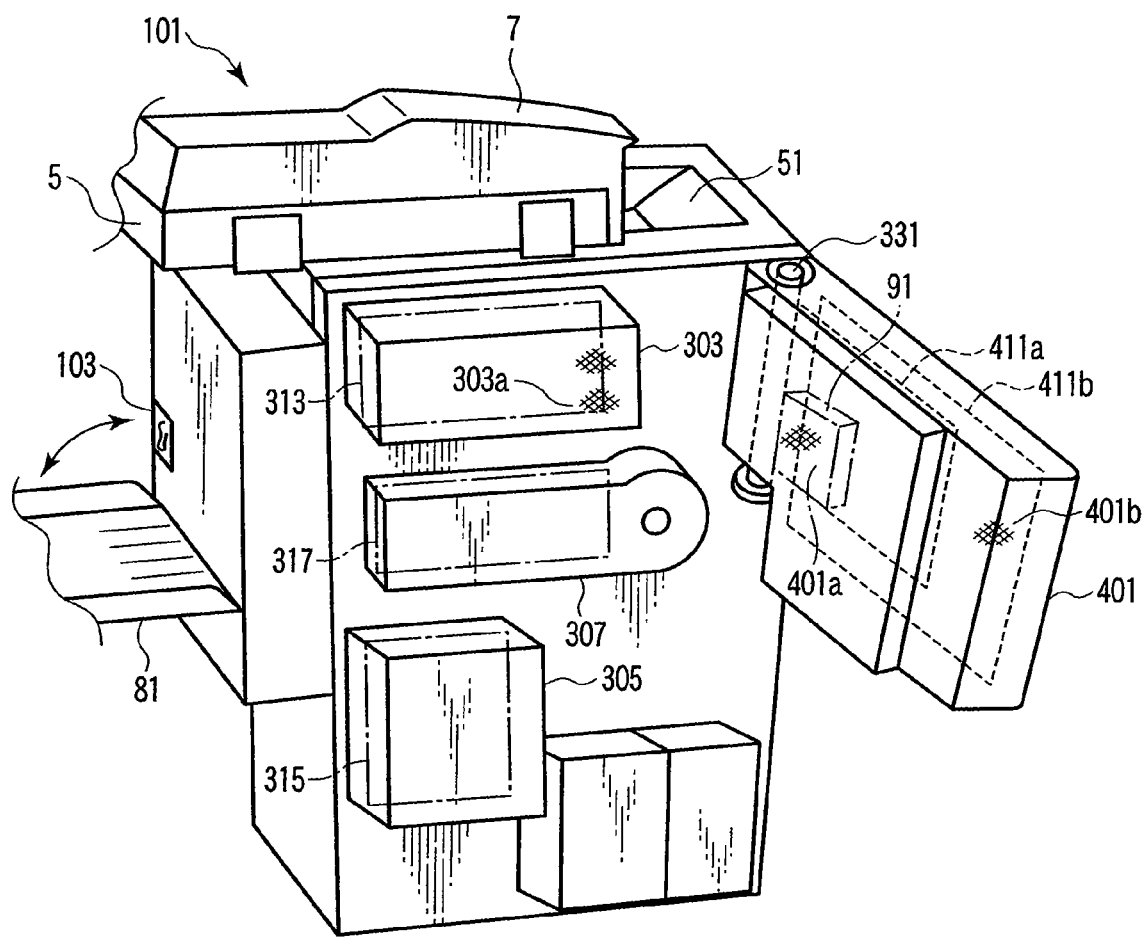
FIG. 16 is a schematic diagram showing a view of a rear end side of the image forming apparatus shown in FIGS. 1 to 9 and 2A, except with a rear cover.

FIG. 16 shows another arrangement of the fan. As shown in FIG. 16, a state in which a cover member on the rear surface of the image forming apparatus 101 is removed and the image forming apparatus 101 is viewed from the rear surface.

The shield case 401 includes a first circuit board 411a and a second circuit board 411b. Each of the circuit boards 411a and 411b are stacked on each other in a direction of the front side to rear side in the image forming apparatus 101. The fan 91 is located between the first circuit board 411a and the second circuit board 411b. Since the fan 91 is arranged inside between the both of the circuit boards (the shield cases), one of the circuit board, the shield case, and the like on the front side have a blocking effect and it is possible to control noise of the fan 91. The circuit boards put in the shield cases are arranged in the front and the rear, one shield case (unit) is configured to be openable and closable via a fulcrum and arranged near the outer side of the image forming apparatus 101 such that the outdoor air can be taken in through the cover, an opening is provided in a bottom surface of the shield case such that the wind can be fed through the opening, the fan 91 is arranged between the front and the rear of the circuit boards such that the wind from the outdoor air can be taken into the other shield case. Therefore, since the circuit boards are arranged in a front to rear direction, a surface area of the circuit boards does not have to be increased and the product (the image forming apparatus 101) is not increased in size.

Since the shield case on the front side is openable and closable via the fulcrum, the shield case is openable and closable by one fixed screw. Therefore, it is possible to easily access the shield case on the inner side for maintenance and easily perform maintenance such as replacement of the circuit boards.

Moreover, for the shield case on the inner side, instead of taking in the wind in the product, it is possible to take in the outdoor air through the shield case of the circuit board on the front side and cooling with a stable air quantity can be performed by the fan 91 arranged between the front and the rear.

Figure 17:
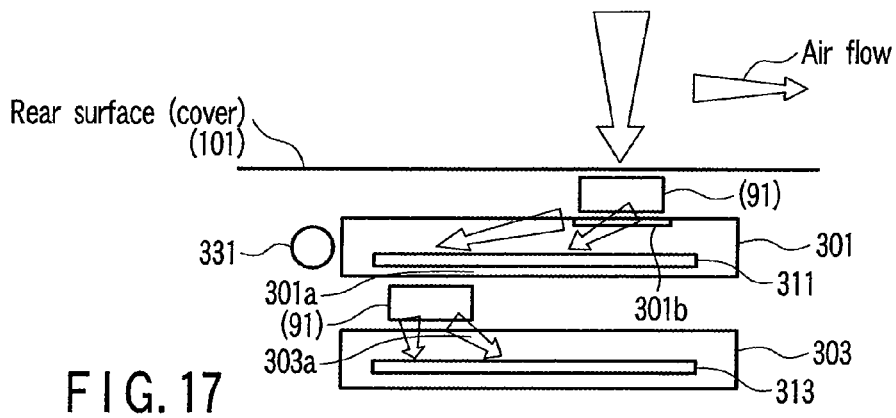
FIG. 17 is a schematic diagram for explaining an example in which another fan is provided on a side of the shield case on an outer side of the shield cases arrayed in the depth (front to rear) direction, and air flow of the arrangement in the image forming apparatus.

FIG. 17 schematically shows an example in which a fan is also provided in a predetermined position on an outer side in a state in which the shield case 301 is closed. In the example shown in FIG. 17, in order to further improve cooling efficiency, it is preferable to provide the air hole 301b (see FIG. 13) on an side on the outer side in the state in which the shield case 301 is closed.

Figure 18:
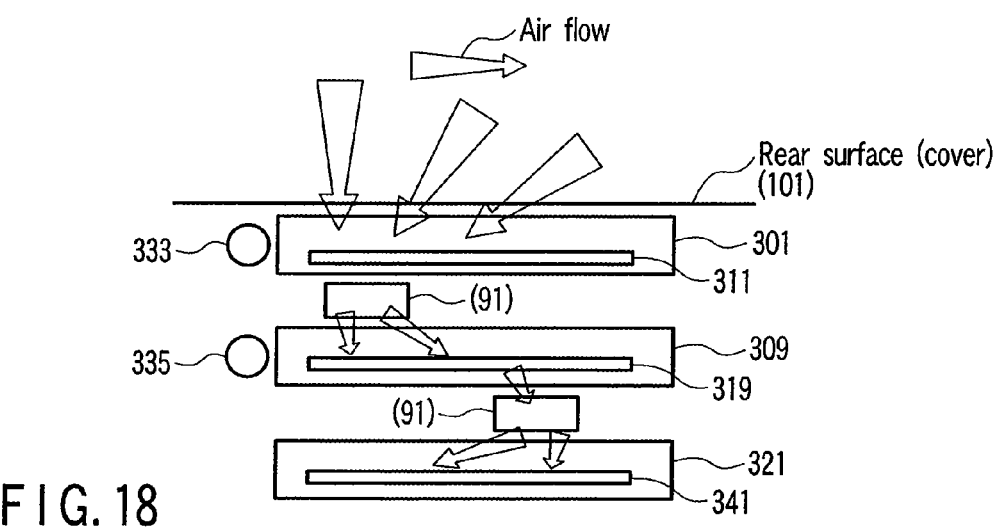
FIG. 18 is a schematic diagram for explaining an example in which circuit boards in the shield cases are cooled by two or more shield cases and two or more fans, and air flow of the arrangement in the image forming apparatus.
Figure 19:
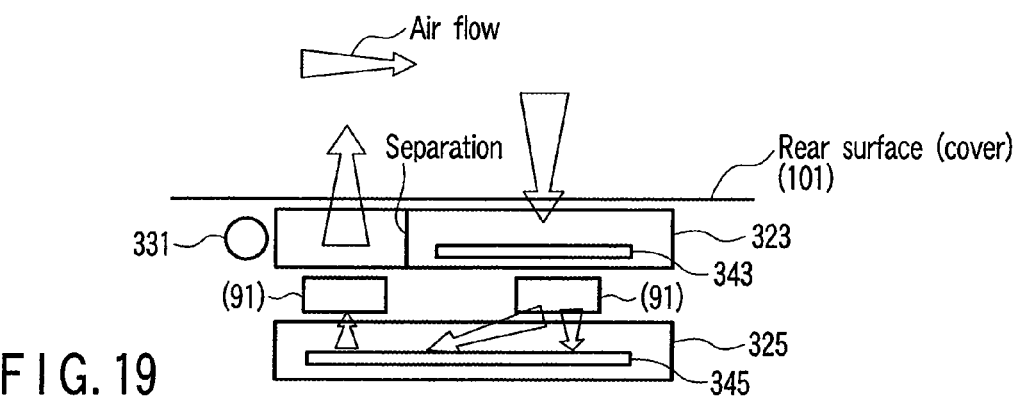
FIG. 19 is a schematic diagram for explaining an example in which circuit boards in the shield cases are cooled by two or more shield cases and two or more fans, and air flow of the arrangement in the image forming apparatus.

FIGS. 18 and 19 schematically show respectively examples in which circuit boards in shield cases are cooled by two or more shield cases and two or more fans.

Some wiring and the like from the (various) units in the product (the image forming apparatus 101) to the circuit boards tend to have influence such as noise or tend to be affected by noise and the like. Some circuit board and the like are preferably arranged in the product to reduce the length of the wiring and the like.

A circuit board arranged inside sometimes has a larger heat value than that of a circuit board arranged on the outside. To prevent heat from being generated from the inside of the product, it is necessary to effectively cool the product and discharge heat.

When plural circuit boards controlled differently of the (various) units in the product (the image forming apparatus 101) are collectively arranged in the front and the rear in one shield case, replaceability of the circuit boards and maintainability of wiring from the circuit board, connection of connectors, and the like are deteriorated.

Since it is necessary to adjust, depending on sizes of the respective circuit boards, the size of the shield case to a large circuit board, a wastefully large shield case is necessary, which affects a size of the product itself.

Therefore, it is useful to use the two or more shield cases as shown in FIGS. 18 and 19 in order to dividedly arrange the respective circuit boards corresponding to control in shield cases having necessary sizes.

For example, as shown in FIG. 18, it is also possible that two shield cases 301 and 309 are arrayed to be capable of turning (opening) independently from each other with rotation fulcrums 333 and 335 as rotation centers, a shield case 321 is provided further on an inner side than the shield case 309 on an inner side (closer to the inside of the image forming apparatus 101), and the fans 91 are arranged between the shield cases 301 and 309 and between the shield cases 309 and 321, respectively. The air (the cooling wind) that has cooled the shield case 321 located on an innermost side is exhausted (to the bottom surface side of the image forming apparatus 101) by, for example, preparing an air hole to the bottom surface side of the image forming apparatus 101, although not shown in the figure. It goes without saying that positions of the fans 91 and a flow of the cooling wind (the air) can be arbitrarily set.

For example, as shown in FIG. 19, it is also possible to arrange two or more fans between a shield case 323 that is located to be capable of turning (opening) with a rotation fulcrum 331 as a rotation center and the inside of which is divided into two or more sections and the shield case 323 provided further on an inner side than the shield case 325 (closer to the inside of the image forming apparatus 101), guide the cooling wind (the air) from the outside to the shield case 325 on the inner side through one section of the shield case 323, and discharge the cooling wind (the air) that has cooled the shield case 325 to the outside through another section of the shield case 323.

As explained above, according to the embodiments of the present invention, it is possible to obtain an image forming apparatus from which a sheet-like medium on which an image or a document is outputted can be easily taken out.

According to the embodiments of the present invention, it is possible to obtain an image forming apparatus that can control heat generation (a temperature increase) within a fixed range and outputs a copy and a printout of an image or a document.

Moreover, according to the embodiments of the present invention, it is possible to obtain an image forming apparatus in which a power switch for forcing to interrupt energization (supply of electric power) to an apparatus main body can be surely actuated when necessary and the power switch cannot be easily turned off at normal time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   an image reading section configured to create image data;
   an image forming section configured to output an image corresponding to the image data onto an output medium;
   a first medium holding section configured to hold the output medium that is outputted by the image forming section and guided in a first direction, and located in a side portion of the image reading section and an upper portion of the image forming section; and
   a second medium holding section configured to hold the output medium that is outputted by the image forming section and guided in a second direction that is the same as the first direction, and located in a side portion of the image reading section and above the first medium holding section.

2. The apparatus of claim 1, further comprising:
   an operation panel located on a rear side section of the image reading section and above the first medium holding section.

3. The apparatus of claim 1, further comprising:
   a fuser unit located on a lower side of the image reading section.

4. The apparatus of claim 3, further comprising:
   an operation panel located on a rear side section of the image reading section and above the first medium holding section.

5. The apparatus of claim 3, wherein the fuser unit is configured to fix a developer image corresponding to the image data created by the image reading section on the output medium.

6. The apparatus of claim 5, wherein the fixing section is located below the image reading section and substantially in a center of an area in a left to right direction of the image reading section.

7. The apparatus of claim 1, wherein part of the second medium holding section is viewable from the plan view side of the first medium holding section.

8. The apparatus of claim 7, wherein a width of the medium holding section is larger than a depth of the medium holding section.

9. The apparatus of claim 1, further comprising:
   a power off switch located in an area usually used in any one of image reading and image formation or both, the power off switch involving an element for limiting access thereto and normal operation thereof being controlled.

10. The apparatus of claim 9, wherein
    the element includes at least one hard disk drive.

11. An image forming apparatus comprising:
    an image reading section configured to generate image data;
    an image forming section configured to output an image corresponding to the image data onto an output medium;
    a memory unit configured to store the image data;
    a main control block configured to control the image forming section to output an output image onto the output medium on the basis of the image data generated by the image reading section and stored in the memory unit;
    a first case member and a second case member that each house any one of the memory unit and the main control block or both; and
    a cooling mechanism configured to be located in a position between the first case member and the second case member and guides an air flow that has passed through one case member to the other case member.

12. The apparatus of claim 11, wherein the cooling mechanism faces the first case member and the second case member on each of an air flow intake side and an air flow discharge side.

13. The apparatus of claim 12, wherein at least one of the first case member and the second case member is able to rotate on a rotation fulcrum and move apart from the other case member.

14. The apparatus of claim 13, wherein at least one of the first case member and the second case member is positioned on a frame of the image forming section and the other case member is able to be swung apart from the image forming section.

15. The apparatus of claim 11, wherein at least one of the first case member and the second case member is able to rotate on a rotation fulcrum and move apart from the other case member.

16. The apparatus of claim 15, wherein at least one of the first case member and the second case member is positioned on a frame of the image forming section and the other case member is able to be swung apart from the image forming section.

17. An image forming apparatus comprising:
    an image reading section configured to create image data;
    an image forming section configured to output an image corresponding to the image data onto an output medium;
    a memory unit configured to store the image data;
    a main control block configured to control the image forming section to output an output image onto the output medium on the basis of the image data generated by the image reading section and stored in the memory unit;
    a first case member and a second case member that each house any one of the memory unit and the main control block or both;
    a cooling mechanism located in a position between the first case member-and the second case member and guides an air flow that has passed through one case member to the other case member;
    a first medium holding section configured to hold the output medium that is outputted by the image forming section and guided in a first direction, and located in a side portion of the image reading section and an upper portion of the image forming section; and
    a second medium holding section configured to hold the output medium that is outputted by the image forming section and guided in a second direction that is the same as the first direction, and located in a side portion of the image reading section and above the first medium holding section.

* * * * *